US012620522B2

(12) United States Patent
Shiga et al.

(10) Patent No.: US 12,620,522 B2
(45) Date of Patent: May 5, 2026

(54) MULTILAYER COIL COMPONENT

(71) Applicant: TDK CORPORATION, Tokyo (JP)

(72) Inventors: Yuto Shiga, Tokyo (JP); Kazuya Tobita, Tokyo (JP); Youichi Kazuta, Tokyo (JP); Yuichi Takubo, Tokyo (JP); So Kobayashi, Tokyo (JP); Xuran Guo, Tokyo (JP); Shunya Suzuki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 702 days.

(21) Appl. No.: 18/085,990

(22) Filed: Dec. 21, 2022

(65) Prior Publication Data

US 2023/0207186 A1 Jun. 29, 2023

(30) Foreign Application Priority Data

Dec. 24, 2021 (JP) ................................ 2021-211063

(51) Int. Cl.
*H01F 27/29* (2006.01)
*H01F 17/00* (2006.01)

(52) U.S. Cl.
CPC ....... *H01F 27/292* (2013.01); *H01F 17/0013* (2013.01)

(58) Field of Classification Search
CPC .... H01F 27/292; H01F 17/0013; H01F 27/28; H01F 27/34
USPC .................................. 336/83, 192, 200, 232
See application file for complete search history.

(56) References Cited

U.S. PATENT DOCUMENTS

| | | | | |
|---|---|---|---|---|
| 2017/0103848 | A1 | 4/2017 | Yoneda et al. | |
| 2018/0068780 | A1* | 3/2018 | Shimoda ............ | H01F 17/0013 |
| 2018/0342341 | A1* | 11/2018 | Aoki ...................... | H01G 4/30 |
| 2021/0027934 | A1* | 1/2021 | Mizukami .......... | H01F 27/2804 |

FOREIGN PATENT DOCUMENTS

| | | | |
|---|---|---|---|
| JP | 2017-073536 | A | 4/2017 |
| JP | 2018-200966 | A | 12/2018 |
| JP | 2021022663 | A | 2/2021 |

* cited by examiner

*Primary Examiner* — Tuyen T Nguyen
(74) *Attorney, Agent, or Firm* — Oliff PLC

(57) ABSTRACT

A plurality of electrode conductors included in a first external electrode and a second external electrode of a multilayer coil component includes a first part in a second direction and a second part in a third direction. A first electrode conductor and a third electrode conductor differ in at least any one dimension of four dimensions including a width of the first part, a length of the first part, a width of the second part, and a length of the second part. A second electrode conductor and a fourth electrode conductor differ in at least any one dimension of the four dimensions. The first electrode conductor and the second electrode conductor differ in at least any one dimension of the four dimensions. The third electrode conductor and the fourth electrode conductor differ in at least any one dimension of the four dimensions.

15 Claims, 27 Drawing Sheets

MULTILAYER COIL COMPONENT

BACKGROUND OF THE INVENTION

1. Field of the Invention

The present disclosure relates to a multilayer coil component.

2. Description of Related Art

Known multilayer coil components include an element body, a coil that is disposed inside the element body, and a pair of external electrodes that each include a plurality of electrode conductors connected to each other and disposed on the element body (for example, refer to Japanese Unexamined Patent Publication No. 2017-073536).

SUMMARY OF THE INVENTION

A multilayer coil component is mounted on an electronic instrument. For example, an electronic instrument includes a circuit board and an electronic component. When a multilayer coil component is mounted on an electronic instrument, an external force from the electronic instrument may act on an external electrode. In a multilayer coil component in which a fixing strength of an external electrode with respect to an element body is insufficient, when an external force from an electronic instrument acts on the external electrode, the external electrode may peel off from the element body. When an external electrode peels off from an element body, a multilayer coil component tends not to function as a coil.

An object of an aspect of the present disclosure is to provide a multilayer coil component in which a fixing strength of an external electrode with respect to an element body is improved.

A multilayer coil component according to one aspect of the present disclosure includes an element body, a coil, and a first external electrode and a second external electrode. The element body includes a main surface constituting a mounting surface, a first side surface and a second side surface opposing each other in a first direction, and a first end surface and a second end surface opposing each other in a second direction orthogonal to the first direction. The coil is disposed inside the element body. The first external electrode and the second external electrode are electrically connected to the coil and disposed on the element body. Each of the first external electrode and the second external electrode includes a plurality of electrode conductors arranged in the first direction and connected to each other. Each of the plurality of electrode conductors includes a first part extending in the second direction and a second part extending in a third direction orthogonal to the second direction when viewed in the first direction. The plurality of electrode conductors included in the first external electrode include a first electrode conductor and a second electrode conductor adjacent to each other in the first direction. The plurality of electrode conductors included in the second external electrode include a third electrode conductor positioned at the same layer as the first electrode conductor, and a fourth electrode conductor positioned at the same layer as the second electrode conductor. The first electrode conductor and the third electrode conductor differ from each other in at least any one dimension of four dimensions including a width of the first part in the third direction, a length of the first part in the second direction, a width of the second part in the second direction, and a length of the second part in the third direction. The second electrode conductor and the fourth electrode conductor differ from each other in at least any one dimension of the four dimensions. The first electrode conductor and the second electrode conductor differ from each other in at least any one dimension of the four dimensions. The third electrode conductor and the fourth electrode conductor differ from each other in at least any one dimension of the four dimensions.

In the one aspect, the first electrode conductor differs from the third electrode conductor positioned in the same layer and the second electrode conductor adjacent thereto in the first direction in shape. The third electrode conductor differs from the fourth electrode conductor adjacent thereto in the first direction in shape. The second electrode conductor differs from the fourth electrode conductor positioned in the same layer in shape. In this case, surfaces of the first external electrode and the second external electrode opposing the element body have a complicated shape. The surfaces opposing the element body are surfaces coming into contact with the element body. Accordingly, an area of the first external electrode coming into contact with the element body and an area of the second external electrode coming into contact with the element body increase. Therefore, in the one aspect, fixing strengths of the first external electrode and the second external electrode with respect to the element body are improved.

In the one aspect, the width of the first part of the first electrode conductor may be smaller than the width of the first part of the second electrode conductor. The length of the first part of the first electrode conductor may be smaller than the length of the first part of the second electrode conductor. The width of the second part of the first electrode conductor may be smaller than the width of the second part of the second electrode conductor. The length of the second part of the first electrode conductor may be smaller than the length of the second part of the second electrode conductor.

In a constitution in which the width of the first part of the first electrode conductor is smaller than the width of the first part of the second electrode conductor, the length of the first part of the first electrode conductor is smaller than the length of the first part of the second electrode conductor, the width of the second part of the first electrode conductor is smaller than the width of the second part of the second electrode conductor, and the length of the second part of the first electrode conductor is smaller than the length of the second part of the second electrode conductor, the surface of the first external electrode opposing the element body has a more complicated shape, and the area of the first external electrode coming into contact with the element body further increases. As a result, the fixing strength of the first external electrode with respect to the element body is further improved.

In the one aspect, the width of the first part of the first electrode conductor may be smaller than the width of the first part of the third electrode conductor. The length of the first part of the first electrode conductor may be smaller than the length of the first part of the third electrode conductor. The width of the second part of the first electrode conductor may be smaller than the width of the second part of the third electrode conductor. The length of the second part of the first electrode conductor may be smaller than the length of the second part of the third electrode conductor.

In a constitution in which the width of the first part of the first electrode conductor is smaller than the width of the first part of the third electrode conductor, the length of the first part of the first electrode conductor is smaller than the length of the first part of the third electrode conductor, the width of the second part of the first electrode conductor is smaller than the width of the second part of the third electrode conductor, and the length of the second part of the first electrode conductor is smaller than the length of the second part of the third electrode conductor, the surfaces of the first external electrode and the second external electrode opposing the element body may have a more complicated shape. When the surfaces of the first external electrode and the second external electrode opposing the element body have a more complicated shape, the area of the first external electrode coming into contact with the element body and the area of the second external electrode coming into contact with the element body further increase. As a result, the fixing strengths of the first external electrode and the second external electrode with respect to the element body are further improved.

In the one aspect, the width of the first part of the first electrode conductor may be larger than the width of the first part of the second electrode conductor. The length of the first part of the first electrode conductor may be larger than the length of the first part of the second electrode conductor. The width of the second part of the first electrode conductor may be smaller than the width of the second part of the second electrode conductor. The length of the second part of the first electrode conductor may be smaller than the length of the second part of the second electrode conductor.

In a constitution in which the width of the first part of the first electrode conductor is larger than the width of the first part of the second electrode conductor, the length of the first part of the first electrode conductor is larger than the length of the first part of the second electrode conductor, the width of the second part of the first electrode conductor is smaller than the width of the second part of the second electrode conductor, and the length of the second part of the first electrode conductor is smaller than the length of the second part of the second electrode conductor, the surface of the first external electrode opposing the element body has a more complicated shape, and the area of the first external electrode coming into contact with the element body further increases. As a result, the fixing strength of the first external electrode with respect to the element body is further improved.

In the one aspect, the width of the first part of the first electrode conductor may be larger than the width of the first part of the third electrode conductor. The length of the first part of the first electrode conductor may be larger than the length of the first part of the third electrode conductor. The width of the second part of the first electrode conductor may be smaller than the width of the second part of the third electrode conductor. The length of the second part of the first electrode conductor may be smaller than the length of the second part of the third electrode conductor.

In a constitution in which the width of the first part of the first electrode conductor is larger than the width of the first part of the third electrode conductor, the length of the first part of the first electrode conductor is larger than the length of the first part of the third electrode conductor, the width of the second part of the first electrode conductor is smaller than the width of the second part of the third electrode conductor, and the length of the second part of the first electrode conductor is smaller than the length of the second part of the third electrode conductor, the surfaces of the first external electrode and the second external electrode opposing the element body may have a more complicated shape. When the surfaces of the first external electrode and the second external electrode opposing the element body have a more complicated shape, the area of the first external electrode coming into contact with the element body and the area of the second external electrode coming into contact with the element body further increase. As a result, the fixing strengths of the first external electrode and the second external electrode with respect to the element body are further improved.

In the one aspect, the plurality of electrode conductors included in the first external electrode may include a fifth electrode conductor and a sixth electrode conductor adjacent to each other in the first direction. The plurality of electrode conductors included in the second external electrode may include a seventh electrode conductor positioned at the same layer as the fifth electrode conductor, and an eighth electrode conductor positioned at the same layer as the sixth electrode conductor. The first electrode conductor may be closest to the first side surface of the plurality of electrode conductors included in the first external electrode, and the fifth electrode conductor may be closest to the second side surface of the plurality of electrode conductors included in the first external electrode. The third electrode conductor may be closest to the first side surface of the plurality of electrode conductors included in the second external electrode, and the seventh electrode conductor may be closest to the second side surface of the plurality of electrode conductors included in the second external electrode. The fifth electrode conductor and the seventh electrode conductor may differ from each other in at least any one dimension of the four dimensions. The sixth electrode conductor and the eighth electrode conductor may differ from each other in at least any one dimension of the four dimensions. The fifth electrode conductor and the sixth electrode conductor may differ from each other in at least any one dimension of the four dimensions. The seventh electrode conductor and the eighth electrode conductor may differ from each other in at least any one dimension of the four dimensions.

In a constitution in which the fifth electrode conductor and the seventh electrode conductor differ from each other in at least any one dimension of the four dimensions, the sixth electrode conductor and the eighth electrode conductor differ from each other in at least any one dimension of the four dimensions, the fifth electrode conductor and the sixth electrode conductor differ from each other in at least any one dimension of the four dimensions, and the seventh electrode conductor and the eighth electrode conductor differ from each other in at least any one dimension of the four dimensions, the fifth electrode conductor differs from the seventh electrode conductor positioned in the same layer and the sixth electrode conductor adjacent thereto in the first direction in shape. The seventh electrode conductor differs from the eighth electrode conductor adjacent thereto in the first direction in shape. The sixth electrode conductor differs from the eighth electrode conductor positioned in the same layer in shape. In this case, the surfaces of the first external electrode and the second external electrode opposing the element body have a more complicated shape. Accordingly, the area of the first external electrode coming into contact with the element body and the area of the second external electrode coming into contact with the element body further increase. As a result, the fixing strengths of the first external electrode and the second external electrode with respect to the element body are further improved.

In the one aspect, the length of the first part of the first electrode conductor may be larger than the length of the first part of the second electrode conductor. The length of the second part of the first electrode conductor may be smaller than the length of the second part of the second electrode conductor. The length of the first part of the fifth electrode conductor may be smaller than the length of the first part of the sixth electrode conductor. The length of the second part of the fifth electrode conductor may be larger than the length of the second part of the sixth electrode conductor.

In a constitution in which the length of the first part of the first electrode conductor is larger than the length of the first part of the second electrode conductor, the length of the second part of the first electrode conductor is smaller than the length of the second part of the second electrode conductor, the length of the first part of the fifth electrode conductor is smaller than the length of the first part of the sixth electrode conductor, and the length of the second part of the fifth electrode conductor is larger than the length of the second part of the sixth electrode conductor, the surface of the first external electrode opposing the element body has a more complicated shape, and the area of the first external electrode coming into contact with the element body further increases. As a result, the fixing strength of the first external electrode with respect to the element body is further improved.

In the one aspect, the coil may include a plurality of coil conductors arranged in the first direction and connected to each other. The plurality of coil conductors may include a first coil conductor positioned at the same layer as the first electrode conductor and the third electrode conductor, and a second coil conductor positioned at the same layer as the fifth electrode conductor and the seventh electrode conductor. Each of the first coil conductor and the second coil conductor may include a third part constituting a portion of an annular trajectory in the coil, and a fourth part being continuous with the third part and protruding to an outward side of the annular trajectory when viewed in the first direction. The fourth part of the first coil conductor may be connected to the second part of the third electrode conductor, and the fourth part of the second coil conductor may be connected to the second part of the fifth electrode conductor. The length of the second part of the third electrode conductor may be smaller than the length of the second part of the fourth electrode conductor. The length of the second part of the fifth electrode conductor may be smaller than the length of the second part of the sixth electrode conductor.

When the first coil conductor includes the fourth part connected to the third electrode conductor and the second coil conductor includes the fourth part connected to the fifth electrode conductor, a volume of the element body is smaller in a layer in which the first coil conductor is positioned and a layer in which the second coil conductor is positioned than those in other layers by an amount corresponding to the fourth part. However, in the foregoing constitution in which the length of the second part of the third electrode conductor is smaller than the length of the second part of the fourth electrode conductor and the length of the second part of the fifth electrode conductor is smaller than the length of the second part of the sixth electrode conductor, volumes of the third electrode conductor and the fifth electrode conductor are reduced. Therefore, the volume of the element body increases in the layer in which the first coil conductor is positioned and the layer in which the second coil conductor is positioned. As a result of increase in volume of the element body, the strength of the multilayer coil component is improved. Since volumes of the external electrodes are smaller than the volume of the element body, cracking tends not to occur in the element body.

In the one aspect, the width of the first part of the first electrode conductor may be larger than the width of the first part of the second electrode conductor. The length of the first part of the first electrode conductor may be smaller than the length of the first part of the second electrode conductor. The width of the second part of the first electrode conductor may be smaller than the width of the second part of the second electrode conductor. The length of the second part of the first electrode conductor may be larger than the length of the second part of the second electrode conductor.

In a constitution in which the width of the first part of the first electrode conductor is larger than the width of the first part of the second electrode conductor, the length of the first part of the first electrode conductor is smaller than the length of the first part of the second electrode conductor, the width of the second part of the first electrode conductor is smaller than the width of the second part of the second electrode conductor, and the length of the second part of the first electrode conductor is larger than the length of the second part of the second electrode conductor, the surface of the first external electrode opposing the element body has a more complicated shape, and the area of the first external electrode coming into contact with the element body further increases. As a result, the fixing strength of the first external electrode with respect to the element body is further improved.

In the one aspect, the width of the first part of the first electrode conductor may be larger than the width of the first part of the third electrode conductor. The length of the first part of the first electrode conductor may be smaller than the length of the first part of the third electrode conductor. The width of the second part of the first electrode conductor may be smaller than the width of the second part of the third electrode conductor. The length of the second part of the first electrode conductor may be larger than the length of the second part of the third electrode conductor.

In a constitution in which the width of the first part of the first electrode conductor is larger than the width of the first part of the third electrode conductor, the length of the first part of the first electrode conductor is smaller than the length of the first part of the third electrode conductor, the width of the second part of the first electrode conductor is smaller than the width of the second part of the third electrode conductor, and the length of the second part of the first electrode conductor is larger than the length of the second part of the third electrode conductor, the surfaces of the first external electrode and the second external electrode opposing the element body may have a more complicated shape. When the surfaces of the first external electrode and the second external electrode opposing the element body have a more complicated shape, the area of the first external electrode coming into contact with the element body and the area of the second external electrode coming into contact with the element body further increase. As a result, the fixing strengths of the first external electrode and the second external electrode with respect to the element body are further improved.

In the one aspect, the coil may include a plurality of coil conductors arranged in the first direction and connected to each other. The plurality of coil conductors may include a first coil conductor positioned at the same layer as the first electrode conductor and the third electrode conductor. A shortest separation distance between the second part of the first electrode conductor and the first coil conductor may be smaller than a shortest separation distance between the second part of the third electrode conductor and the first coil conductor. The width of the second part of the first electrode conductor may be smaller than the width of the second part of the third electrode conductor. The length of the second part of the first electrode conductor may be smaller than the length of the second part of the third electrode conductor.

In a constitution in which the shortest separation distance between the second part of the first electrode conductor and the first coil conductor is smaller than the shortest separation distance between the second part of the third electrode conductor and the first coil conductor, the width of the second part of the first electrode conductor is smaller than the width of the second part of the third electrode conductor, and the length of the second part of the first electrode conductor is smaller than the length of the second part of the third electrode conductor, a volume of the second part of the first electrode conductor positioned close to the first coil conductor is further reduced than a volume of the second part of the third electrode conductor, and increase in stray capacitance generated between the second part of the first electrode conductor and the first coil conductor is curbed.

In the one aspect, the plurality of coil conductors may include a third coil conductor positioned at the same layer as the second electrode conductor and the fourth electrode conductor. The shortest separation distance between the second part of the first electrode conductor and the first coil conductor may be smaller than a shortest separation distance between the second part of the second electrode conductor and the third coil conductor. The width of the second part of the first electrode conductor may be smaller than the width of the second part of the second electrode conductor. The length of the second part of the first electrode conductor may be smaller than the length of the second part of the second electrode conductor.

In a constitution in which the shortest separation distance between the second part of the first electrode conductor and the first coil conductor is smaller than the shortest separation distance between the second part of the second electrode conductor and the third coil conductor, the width of the second part of the first electrode conductor is smaller than the width of the second part of the second electrode conductor, and the length of the second part of the first electrode conductor is smaller than the length of the second part of the second electrode conductor, the volume of the second part of the first electrode conductor positioned close to the coil conductor in the same layer is further reduced than a volume of the second part of the second electrode conductor, and increase in stray capacitance generated between the second part of the first electrode conductor and the first coil conductor is curbed.

In the one aspect, the first part of each of the plurality of electrode conductors may include a first end and a second end in the second direction. The second part of each of the plurality of electrode conductors may include a first end and a second end in the third direction. The first end of the first part and the first end of the second part may be continuous with each other. A surface of each of the second end of the first part and the second end of the second part may be curved when viewed in the first direction.

In a constitution in which the surface of each of the second end of the first part and the second end of the second part is curved, compared to a constitution in which the surface of each of the second end of the first part and the second end of the second part is not curved and includes corner portions projecting to the inward side of the element body, the volume of each of the electrode conductors may be reduced. When the volume of each of the electrode conductors is reduced, the volume of the element body relatively increases, and the strength of the multilayer coil component is improved. When the volume of each of the electrode conductors is reduced, the stray capacitance generated between each of the electrode conductors and the coil is reduced.

The present invention will become more fully understood from the detailed description given hereinafter and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating embodiments of the invention, are given by way of illustration only, since various changes and modifications within the spirit and scope of the invention will become apparent to those skilled in the art from this detailed description.

DETAILED DESCRIPTION OF EMBODIMENTS

Figure 1:
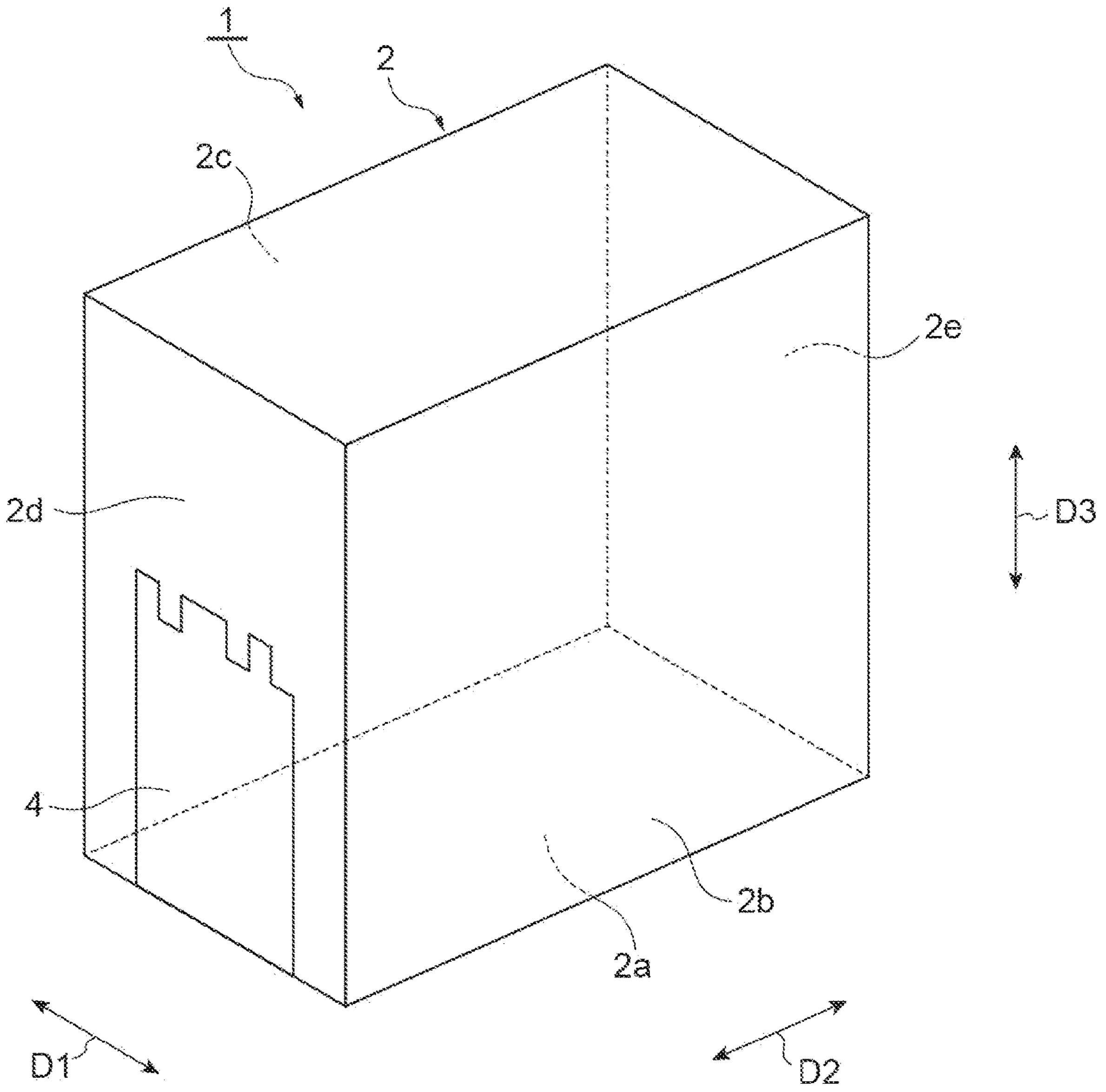
FIG. 1 is a perspective view illustrating a multilayer coil component according to a first embodiment.

Hereinafter, embodiments of the present invention will be described in detail with reference to the accompanying drawings. In the following description, the same elements or elements having the same functions are denoted with the same reference numerals and overlapped explanation is omitted.

First Embodiment

Figure 2:
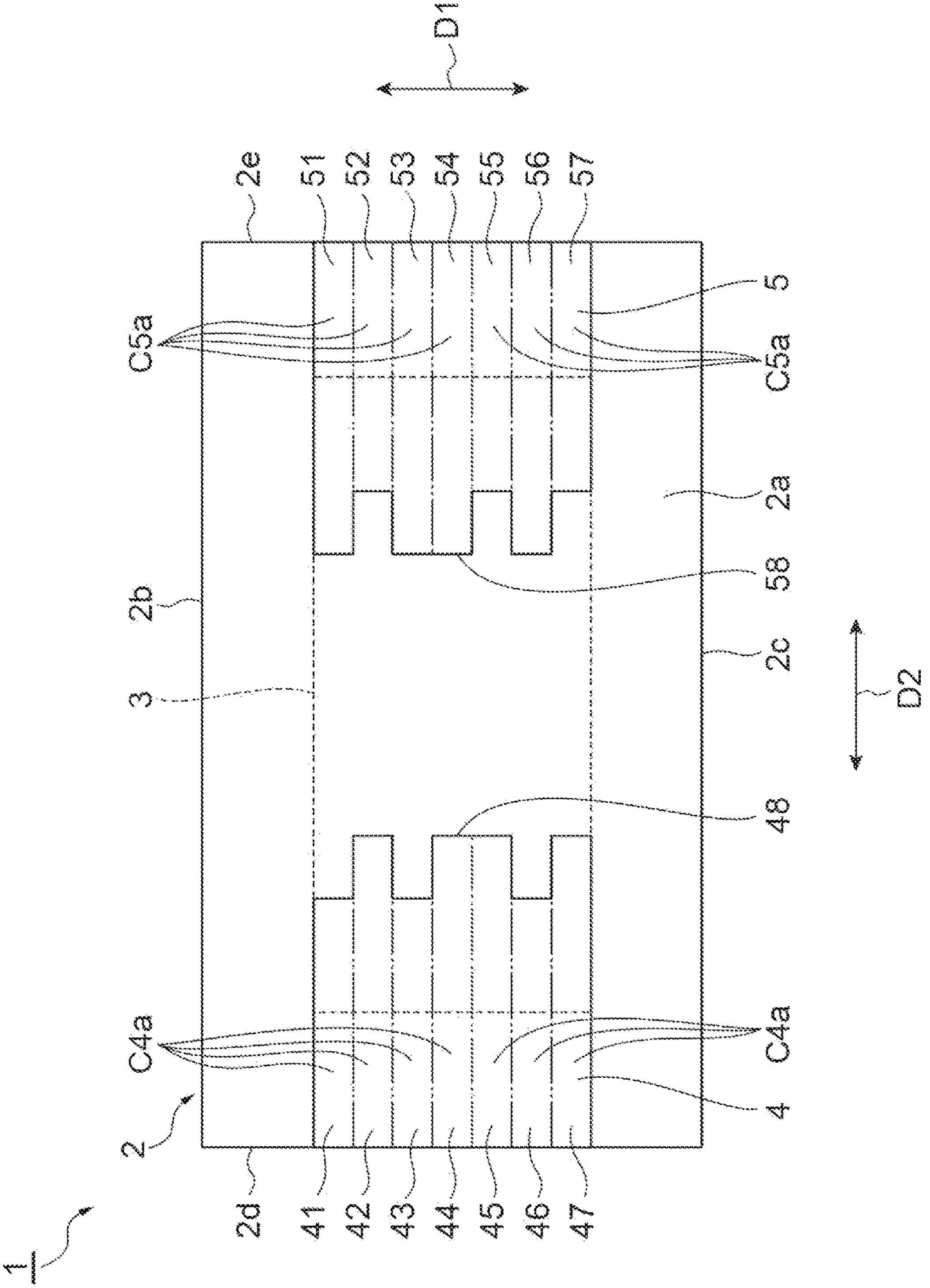
FIG. 2 is a plan view of the multilayer coil component according to the first embodiment viewed from a main surface side.
Figure 3:
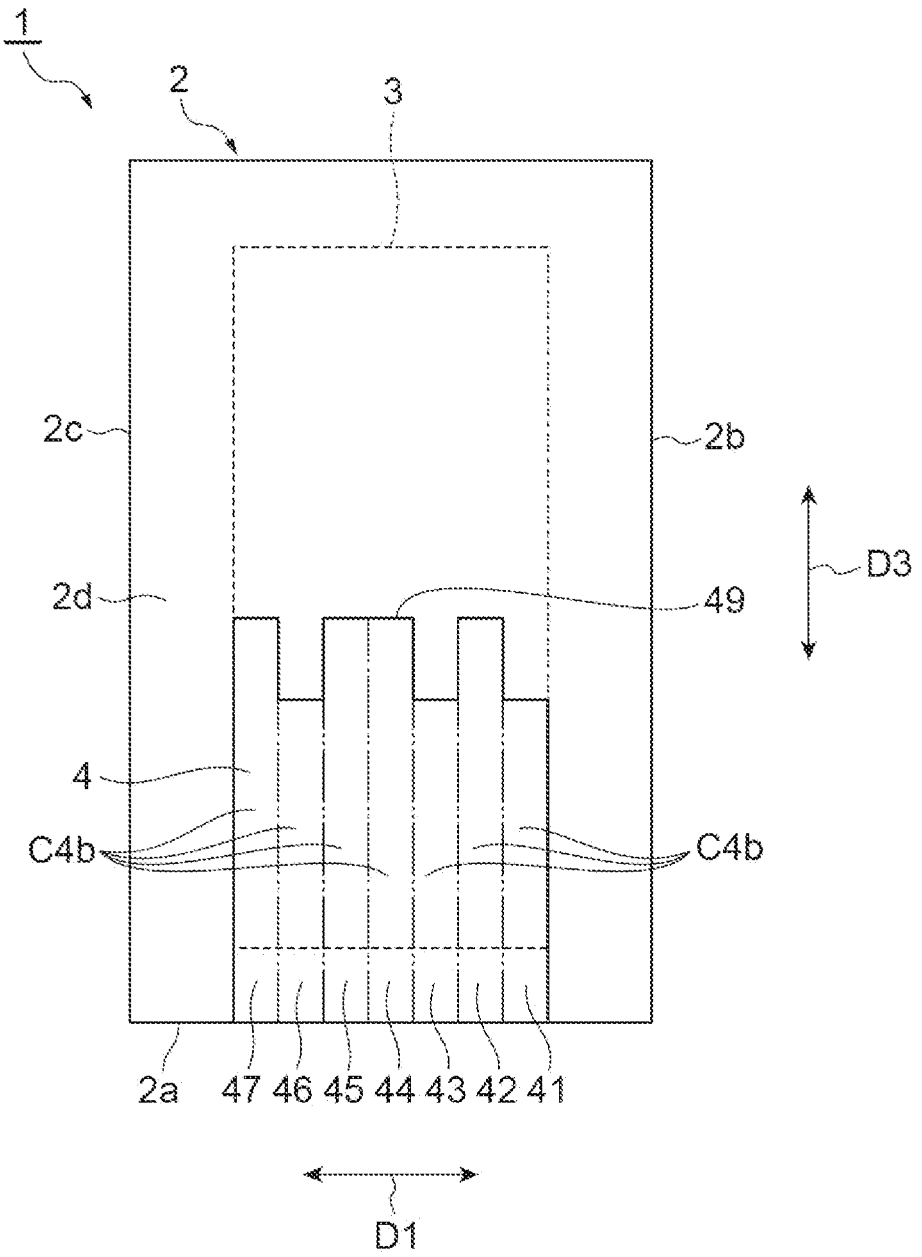
FIG. 3 is a plan view of the multilayer coil component according to the first embodiment viewed from one end surface side.
Figure 4:
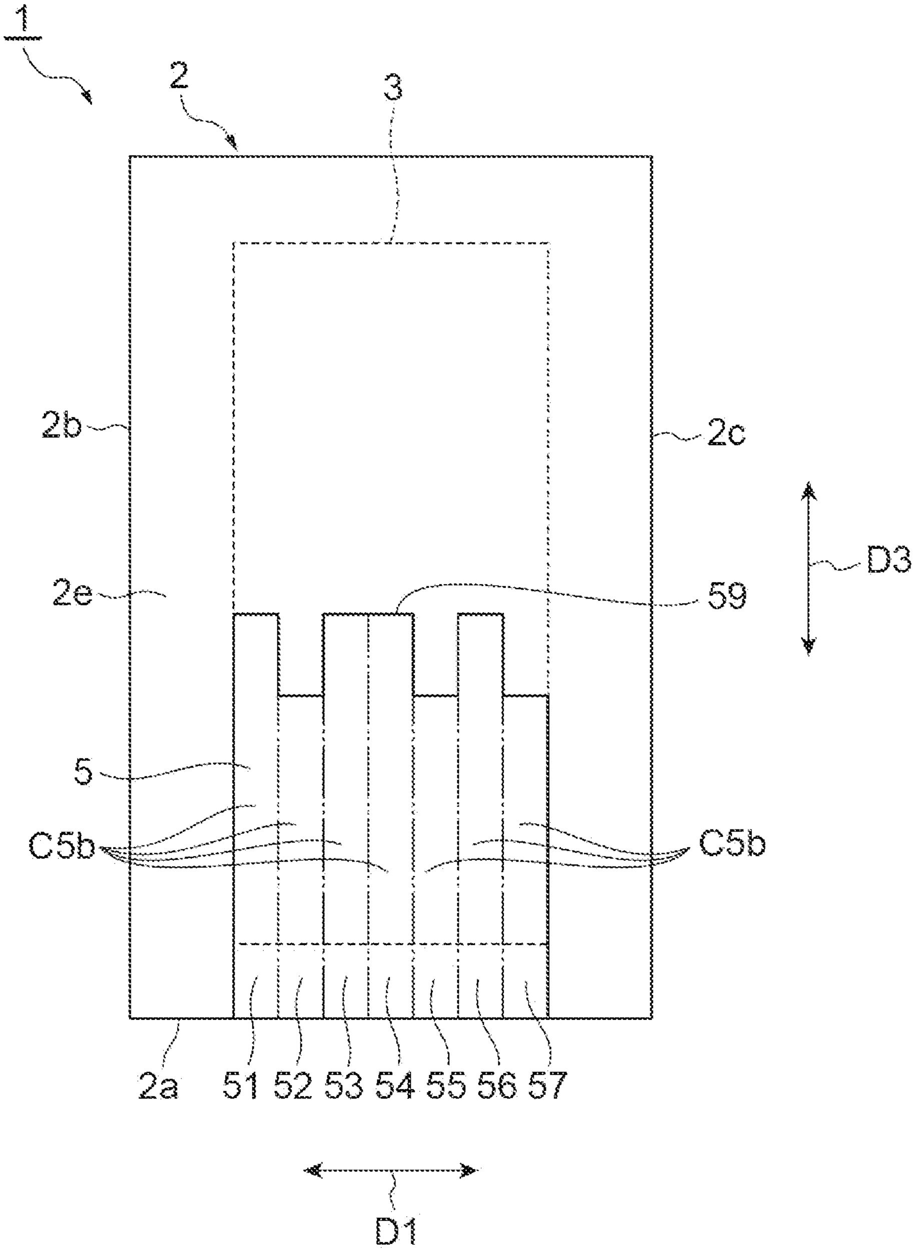
FIG. 4 is a plan view of the multilayer coil component according to the first embodiment viewed from the other end surface side.
Figure 5:
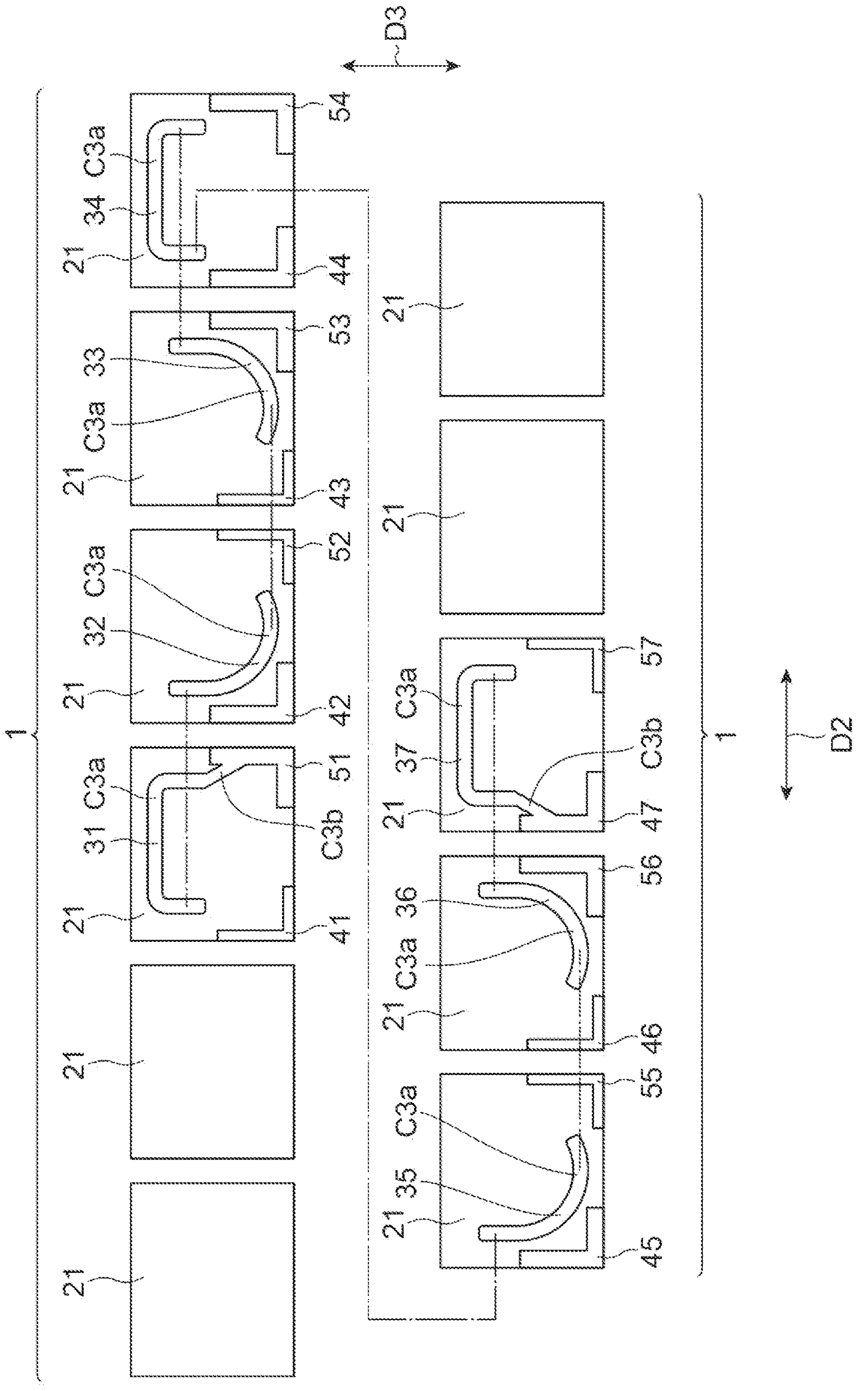
FIG. 5 is an exploded view illustrating a constitution of the multilayer coil component according to the first embodiment.

A multilayer coil component 1 according to a first embodiment will be described with reference to FIGS. 1 to 5. FIG. 1 is a perspective view illustrating the multilayer coil component 1. FIG. 2 is a plan view of the multilayer coil component 1 viewed from a main surface 2*a* side. FIG. 3 is a plan view of the multilayer coil component 1 viewed from an end surface 2*d* side. FIG. 4 is a plan view of the multilayer coil component 1 viewed from an end surface 2*e* side. FIG. 5 is an exploded view illustrating a constitution of the multilayer coil component 1. The multilayer coil component 1 includes an element body 2, a coil 3, and a pair of external electrodes 4 and 5.

The element body 2 has a rectangular parallelepiped shape. A rectangular parallelepiped shape includes a rectangular shape in which corner portions and ridgeline portions are chamfered, and a rectangular shape in which corner portions and ridgeline portions are rounded. The element body 2 includes a main surface 2*a*, side surfaces 2*b* and 2*c*, and end surfaces 2*d* and 2*e*. The side surface 2*b* and the side surface 2*c* oppose each other. For example, when the side surface 2*b* constitutes a first side surface, the side surface 2*c* constitutes a second side surface. The end surface 2*d* and the end surface 2*e* oppose each other. For example, when the end surface 2*d* constitutes a first end surface, the end surface 2*e* constitutes a second end surface. Hereinafter, a direction in which the side surfaces 2*b* and 2*c* oppose each other will be referred to as a first direction D1, a direction in which the end surfaces 2*d* and 2*e* oppose each other will be referred to as a second direction D2, and a direction perpendicular to the main surface 2*a* will be referred to as a third direction D3. The first direction D1, the second direction D2, and the third direction D3 are orthogonal to each other.

The main surface 2*a* extends in the first direction D1 and the second direction D2. The pair of side surfaces 2*b* and 2*c* extend in the second direction D2 and the third direction D3. The pair of end surfaces 2*d* and 2*e* extend in the first direction D1 and the third direction D3. The main surface 2*a* connects the side surface 2*b* and the side surface 2*c* to each other. The main surface 2*a* connects the end surface 2*d* and the end surface 2*e* to each other. For example, the multilayer coil component 1 is subjected to solder-mounting on an electronic instrument. For example, an electronic instrument is a circuit board or an electronic component. In the multilayer coil component 1, the main surface 2*a* constitutes a mounting surface opposing an electronic instrument.

The element body 2 includes a plurality of insulator layers 21. The element body 2 includes the plurality of insulator layers 21 stacked in the first direction D1. In an actual element body 2, each of the insulator layers 21 may be integrated to the extent that a boundary between the insulator layers 21 cannot be visually recognized. For example, each of the insulator layers 21 includes a magnetic material. Examples of a magnetic material include a Ni-Cu-Zn-based ferrite material, a Ni-Cu-Zn-Mg-based ferrite material, and a Ni-Cu-based ferrite material. For example, each of the insulator layers 21 is constituted of a sintered body of a green sheet including a magnetic material. A magnetic material constituting each of the insulator layers 21 may include a Fe alloy. Each of the insulator layers 21 may include a non-magnetic material. Examples of a non-magnetic material include a glass-ceramic material and a dielectric material.

The coil 3 is disposed inside the element body 2. An axial direction of the coil 3 extends in the first direction D1. The coil 3 includes a plurality of coil conductors 31, 32, 33, 34, 35, 36, and 37. The coil 3 includes a plurality of coil conductors 31 to 37 stacked in the first direction D1. The coil conductor 31, the coil conductor 32, the coil conductor 33, the coil conductor 34, the coil conductor 35, the coil conductor 36, and the coil conductor 37 are stacked in a direction toward the side surface 2*c* from the side surface 2*b* in this order. The plurality of coil conductors 31 to 37 are arranged in the first direction D1, that is, the coil axis direction of the coil 3.

The coil conductor 31 and the coil conductor 37 are outermost coil conductors positioned on the outermost sides in the first direction D1 of the plurality of coil conductors 31 to 37. The coil conductor 31 and the coil conductor 37 are positioned at the ends of the coil 3 in the coil axis direction of the coil 3. The coil conductor 31 is closest to the side surface 2*b* of the plurality of coil conductors 31 to 37. The coil conductor 37 is closest to the side surface 2*c* of the plurality of coil conductors 31 to 37. For example, when the coil conductor 31 constitutes a first coil conductor, the coil conductor 37 constitutes a second coil conductor. The plurality of coil conductors 32 to 36 are positioned between the coil conductor 31 and the coil conductor 37 in the first direction D1.

The plurality of coil conductors 31 to 37 are connected to each other. The plurality of coil conductors 31 to 37 being connected to each other denote that the plurality of coil conductors 31 to 37 are electrically or physically connected to each other. In an actual coil 3, the coil conductors 31 to 37 may be integrated to the extent that the boundaries between the respective coil conductors 31 to 37 cannot be visually recognized. Each of the coil conductors 31 to 37 includes an electrically conductive material. For example, an electrically conductive material is Ag or Pd. For example, each of the coil conductors 31 to 37 is constituted as a sintered body of an electrically conductive paste including an electrically conductive material powder. For example, an electrically conductive material powder is Ag powder or Pd powder.

The pair of external electrodes 4 and 5 are electrically connected to the coil 3 and disposed on the element body 2. The pair of external electrodes 4 and 5 are respectively disposed at both end portions of the element body 2 in the second direction D2. The pair of external electrodes 4 and 5 are separated from each other in the second direction D2. The external electrode 4 is disposed on the end surface 2*d* side of the element body 2. The external electrode 5 is disposed on the end surface 2*e* side of the element body 2. Each of the external electrodes 4 and 5 is buried in the element body 2. Each of the external electrodes 4 and 5 has an L-shape when viewed in the first direction D1. The external electrode 4 is exposed from the element body 2 on only the main surface 2*a* and the end surface 2*d*. The surface of the external electrode 4 exposed from the element body 2 is flush with the main surface 2*a* and the end surface 2*d*. The external electrode 5 is exposed from the element body 2 on only the main surface 2*a* and the end surface 2*e*. The surface of the external electrode 5 exposed from the element body 2 is flush with the main surface 2*a* and the end surface 2*e*. For example, when the external electrode 4 constitutes a first external electrode, the external electrode 5 constitutes a second external electrode.

The external electrode 4 includes a plurality of electrode conductors 41, 42, 43, 44, 45, 46, and 47. The external electrode 4 includes a plurality of electrode conductors 41 to 47 stacked in the first direction D1. The electrode conductor 41, the electrode conductor 42, the electrode conductor 43, the electrode conductor 44, the electrode conductor 45, the electrode conductor 46, and the electrode conductor 47 are stacked in a direction toward the side surface 2*c* from the side surface 2*b* in this order. The plurality of electrode conductors 41 to 47 are arranged in the first direction D1, that is, the coil axis direction of the coil 3. The electrode conductor 41 and the electrode conductor 42 are adjacent to each other in the first direction D1. For example, when the electrode conductor 41 constitutes a first electrode conductor, the electrode conductor 42 constitutes a second electrode conductor. The electrode conductor 46 and the electrode conductor 47 are adjacent to each other in the first direction D1. For example, when the electrode conductor 46 constitutes a sixth electrode conductor, the electrode conductor 47 constitutes a fifth electrode conductor.

The electrode conductor 41 and the electrode conductor 47 are outermost electrode conductors positioned on the outermost sides in the first direction D1 of the plurality of electrode conductors 41 to 47. The electrode conductor 41 and the electrode conductor 47 are positioned at the ends of the external electrode 4 in the first direction D1. The electrode conductor 41 is closest to the side surface 2*b* of the plurality of electrode conductors 41 to 47. The electrode conductor 47 is closest to the side surface 2*c* of the plurality of electrode conductors 41 to 47. The electrode conductor 41 is positioned in the same layer as the coil conductor 31. The electrode conductor 47 is positioned in the same layer as the coil conductor 37. The plurality of electrode conductors 42 to 46 are positioned between the electrode conductor 41 and the electrode conductor 47 in the first direction D1. The plurality of electrode conductors 42 to 46 are positioned in the same layer as the plurality of coil conductors 32 to 36.

The plurality of electrode conductors 41 to 47 are connected to each other. The plurality of electrode conductors 41 to 47 being connected to each other denote that the plurality of electrode conductors 41 to 47 are electrically or physically connected to each other. In an actual external electrode 4, the electrode conductors 41 to 47 may be integrated to the extent that the boundaries between the respective electrode conductors 41 to 47 cannot be visually recognized. Each of the electrode conductors 41 to 47 includes an electrically conductive material. For example, an electrically conductive material is Ag or Pd. For example, each of the electrode conductors 41 to 47 is constituted as a sintered body of an electrically conductive paste including an electrically conductive material powder. For example, an electrically conductive material powder is Ag powder or Pd powder. A material of each of the electrode conductors 41 to 47 may be the same as the material of each of the coil conductors 31 to 37.

The external electrode 5 includes a plurality of electrode conductors 51, 52, 53, 54, 55, 56, and 57. The external electrode 5 includes a plurality of electrode conductors 51 to 57 stacked in the first direction D1. The electrode conductor 51, the electrode conductor 52, the electrode conductor 53, the electrode conductor 54, the electrode conductor 55, the electrode conductor 56, and the electrode conductor 57 are stacked in a direction toward the side surface 2*c* from the side surface 2*b* in this order. The plurality of electrode conductors 51 to 57 are arranged in the first direction D1, that is, the coil axis direction of the coil 3. The electrode conductor 51 and the electrode conductor 52 are adjacent to each other in the first direction D1. The electrode conductor 51 is positioned in the same layer as the electrode conductor 41, and the electrode conductor 52 is positioned in the same layer as the electrode conductor 42. For example, when the electrode conductor 51 constitutes a third electrode conductor, the electrode conductor 52 constitutes a fourth electrode conductor. The electrode conductor 56 and the electrode conductor 57 are adjacent to each other in the first direction D1. The electrode conductor 56 is positioned in the same layer as the electrode conductor 46, and the electrode conductor 57 is positioned in the same layer as the electrode conductor 47. For example, when the electrode conductor 56 constitutes an eighth electrode conductor, the electrode conductor 57 constitutes a seventh electrode conductor.

The electrode conductor 51 and the electrode conductor 57 are outermost electrode conductors positioned on the outermost sides in the first direction D1 of the plurality of electrode conductors 51 to 57. The electrode conductor 51 and the electrode conductor 57 are positioned at the ends of the external electrode 5 in the first direction D1. The electrode conductor 51 is closest to the side surface 2*b* of the plurality of electrode conductors 51 to 57. The electrode conductor 57 is closest to the side surface 2*c* of the plurality of electrode conductors 51 to 57. The electrode conductor 51 is positioned in the same layer as the coil conductor 31, and the electrode conductor 57 is positioned in the same layer as the coil conductor 37. The plurality of electrode conductors 52 to 56 are positioned between the electrode conductor 51 and the electrode conductor 57 in the first direction D1. The plurality of electrode conductors 52 to 56 are positioned in the same layer as the plurality of coil conductors 32 to 36.

The plurality of electrode conductors 51 to 57 are connected to each other. The plurality of electrode conductors 51 to 57 being connected to each other denote that the plurality of electrode conductors 51 to 57 are electrically or physically connected to each other. In an actual external electrode 5, the electrode conductors 51 to 57 may be integrated to the extent that the boundaries between the respective electrode conductors 51 to 57 cannot be visually recognized. Each of the electrode conductors 51 to 57 includes an electrically conductive material. For example, an electrically conductive material is Ag or Pd. For example, each of the electrode conductors 51 to 57 is constituted as a sintered body of an electrically conductive paste including an electrically conductive material powder. For example, an electrically conductive material powder is Ag powder or Pd powder. A material of each of the electrode conductors 51 to 57 may be the same as the material of each of the coil conductors 31 to 37.

Figure 6:
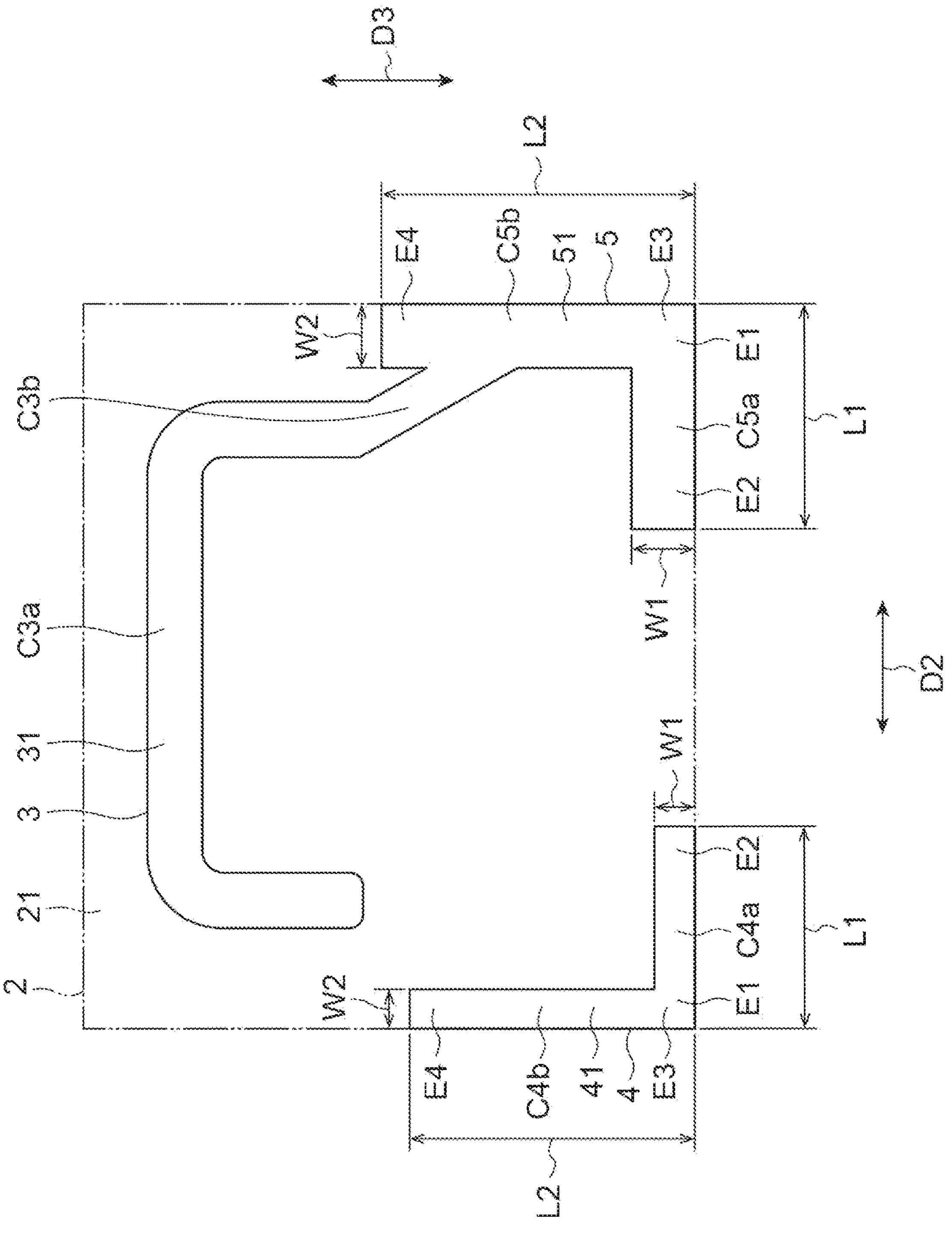
FIG. 6 is a view illustrating a constitution of a coil conductor and electrode conductors.
Figure 7:
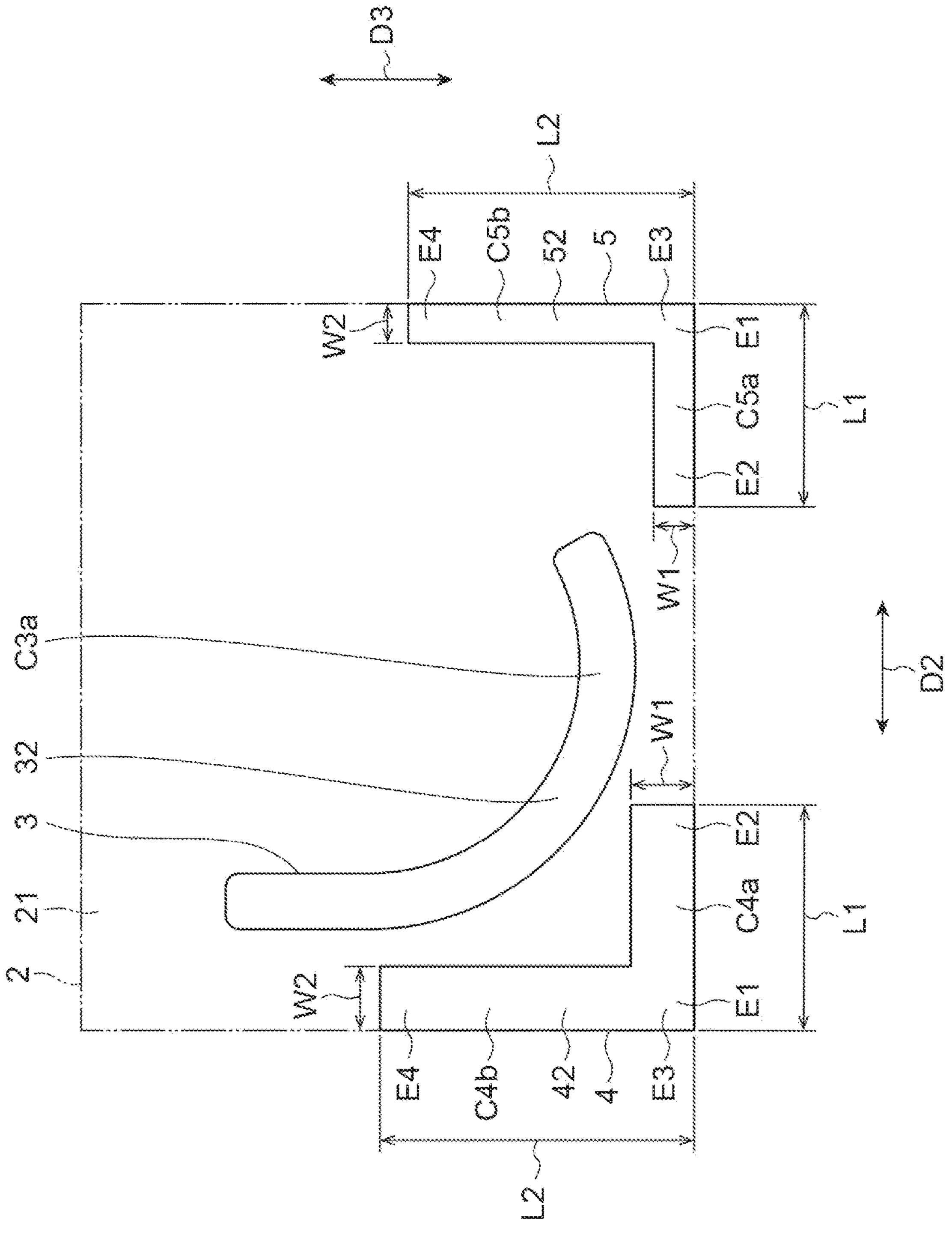
FIG. 7 is a view illustrating a constitution of another coil conductor and other electrode conductors.

Constitutions of the coil conductors 31 to 37, the electrode conductors 41 to 47, and the electrode conductors 51 to 57 will be described in more detail with reference to FIGS. 6 and 7. FIG. 6 is a view illustrating a constitution of the coil conductor 31 and the electrode conductors 41 and 51. FIG. 7 is a view illustrating a constitution of the coil conductor 32 and the electrode conductors 42 and 52.

Each of the plurality of coil conductors 31 to 37 includes a conductor part C3*a*. The conductor part C3*a* constitutes a portion of an annular trajectory in the coil 3 and extends to surround the coil axis of the coil 3. Each of the coil conductor 31 and the coil conductor 37 further includes a conductor part C3*b*. The conductor part C3*b* is continuous with the conductor part C3*a* and protrudes to an outward side of the annular trajectory of the coil 3 when viewed in the first direction D1. The conductor part C3*b* extends straight in a direction intersecting the second direction D2 and the third direction D3 when viewed in the first direction D1. For example, when the conductor part C3*a* constitutes a third part, the conductor part C3*b* constitutes a fourth part.

As illustrated in FIG. 5, one end of the conductor part C3*b* of the coil conductor 31 is continuous with the electrode conductor 51, and the other end of the conductor part C3*b* of the coil conductor 31 is continuous with one end of the conductor part C3*a* of the coil conductor 31. The other end of the conductor part C3*a* of the coil conductor 31 is physically directly connected to one end of the conductor part C3*a* of the coil conductor 32 in the first direction D1. The other end of the conductor part C3*a* of the coil conductor 32 is physically directly connected to one end of the conductor part C3*a* of the coil conductor 33 in the first direction D1. The other end of the conductor part C3*a* of the coil conductor 33 is physically directly connected to one end of the conductor part C3*a* of the coil conductor 34 in the first direction D1. The other end of the conductor part C3*a* of the coil conductor 34 is physically directly connected to one end of the conductor part C3*a* of the coil conductor 35 in the first direction D1. The other end of the conductor part C3*a* of the coil conductor 35 is physically directly connected to one end of the conductor part C3*a* of the coil conductor 36 in the first direction D1. The other end of the conductor part C3*a* of the coil conductor 36 is physically directly connected to one end of the conductor part C3*a* of the coil conductor 37 in the first direction D1. The other end of the conductor part C3*a* of the coil conductor 37 is continuous with one end of the conductor part C3*b* of the coil conductor 37. The other end of the conductor part C3*b* of the coil conductor 37 is continuous with the electrode conductor 47.

Each of the plurality of electrode conductors 41 to 47 includes a conductor part C4*a* and a conductor part C4*b*. As illustrated in FIGS. 6 and 7, the conductor part C4*a* extends in the second direction D2 when viewed in the first direction D1. The conductor part C4*b* extends in the third direction D3 when viewed in the first direction D1. For example, when the conductor part C4*a* constitutes a first part, the conductor part C4*b* constitutes a second part. The conductor part C4*a* includes a first end E1 and a second end E2 in the second direction D2. The conductor part C4*b* includes a first end E3 and a second end E4 in the third direction D3. The first end E1 of the conductor part C4*a* and the first end E3 of the conductor part C4*b* are continuous with each other.

The conductor part C4*a* has a width W1 in the third direction D3 and a length L1 in the second direction D2. The width W1 is the widest width of the conductor part C4*a* in the third direction D3. The length L1 is the longest length of the conductor part C4*a* in the second direction D2. The conductor part C4*b* has a width W2 in the second direction D2 and a length L2 in the third direction D3. The width W2 is the widest width of the conductor part C4*b* in the second direction D2. The length L2 is the longest length of the conductor part C4*b* in the third direction D3.

Each of the plurality of electrode conductors 51 to 57 includes a conductor part C5*a* and a conductor part C5*b*. The conductor part C5*a* extends in the second direction D2 when viewed in the first direction D1. The conductor part C5*b* extends in the third direction D3 when viewed in the first direction D1. For example, when the conductor part C5*a* constitutes a first part, the conductor part C5*b* constitutes a second part. The conductor part C5*a* includes the first end E1 and the second end E2 in the second direction D2. The conductor part C5*b* includes the first end E3 and the second end E4 in the third direction D3. The first end E1 of the conductor part C5*a* and the first end E3 of the conductor part C5*b* are continuous with each other.

The conductor part C5*a* has the width W1 in the third direction D3 and the length L1 in the second direction D2. The width W1 is the widest width of the conductor part C5*a* in the third direction D3. The length L1 is the longest length of the conductor part C5*a* in the second direction D2. The conductor part C5*b* has the width W2 in the second direction D2 and the length L2 in the third direction D3. The width W2 is the widest width of the conductor part C5*b* in the second direction D2. The length L2 is the longest length of the conductor part C5*b* in the third direction D3. Hereinafter, four dimensions including the width W1 of each of the conductor part C4*a* and the conductor part C5*a*, the length L1 of each of the conductor part C4*a* and the conductor part C5*a*, the width W2 of each of the conductor part C4*b* and the conductor part C5*b*, and the length L2 of each of the conductor part C4*b* and the conductor part C5*b* will be simply referred to as "four dimensions".

The electrode conductor 41 and the electrode conductor 51 differ from each other in at least any one dimension of the four dimensions. In the present embodiment, the electrode conductor 41 and the electrode conductor 51 differ from each other in all of the four dimensions. As illustrated in FIG. 6, the width W1 of the conductor part C4*a* of the electrode conductor 41 is smaller than the width W1 of the conductor part C5*a* of the electrode conductor 51. As an example, when the element body 2 has a size of 0201, the width W1 of the conductor part C4*a* of the electrode conductor 41 may be equal to or greater than 10 μm and equal to or less than 25 μm, for example, and the width W1 of the conductor part C5*a* of the electrode conductor 51 may be equal to or greater than 15 μm and equal to or less than 30 μm, for example. Regarding the size of 0201, the length of the element body 2 in the second direction D2 may be 0.250 mm, and the length of the element body 2 in the first direction D1 may be 0.125 mm. The width W1 may vary in accordance with the size of the element body 2.

The length L1 of the conductor part C4*a* of the electrode conductor 41 is smaller than the length L1 of the conductor part C5*a* of the electrode conductor 51. As an example, when the element body 2 has a size of 0201, the length L1 of the conductor part C4*a* of the electrode conductor 41 may be equal to or greater than 105 μm and equal to or less than 150 μm, for example, and the length L1 of the conductor part C5*a* of the electrode conductor 51 may be equal to or greater than 110 μm and equal to or less than 155 μm, for example. The length L1 may vary in accordance with the size of the element body 2.

The width W2 of the conductor part C4*b* of the electrode conductor 41 is smaller than the width W2 of the conductor part C5*b* of the electrode conductor 51. As an example, when the element body 2 has a size of 0201, the width W2 of the conductor part C4*b* of the electrode conductor 41 may be equal to or greater than 10 μm and equal to or less than 25 μm, for example, and the width W2 of the conductor part C5*b* of the electrode conductor 51 may be equal to or greater than 15 μm and equal to or less than 30 pin for example. The width W2 may vary in accordance with the size of the element body 2.

The length L2 of the conductor part C4*b* of the electrode conductor 41 is smaller than the length L2 of the conductor part C5*b* of the electrode conductor 51. As an example, when the element body 2 has a size of 0201, the length L2 of the conductor part C4*b* of the electrode conductor 41 may be equal to or greater than 105 μm and equal to or less than 150 μm, for example, and the length L2 of the conductor part C5*b* of the electrode conductor 51 may be equal to or greater than 110 μm and equal to or less than 155 μm, for example. The length L2 may vary in accordance with the size of the element body 2.

The electrode conductor 42 and the electrode conductor 52 differ from each other in at least any one dimension of the four dimensions. In the present embodiment, the electrode conductor 42 and the electrode conductor 52 differ from each other in all of the four dimensions. As illustrated in FIG. 7, the width W1 of the conductor part C4*a* of the electrode conductor 42 is larger than the width W1 of the conductor part C5*a* of the electrode conductor 52. The width W1 of the conductor part C4*a* of the electrode conductor 42 may be equivalent to the width W1 of the conductor part C5*a* of the electrode conductor 51. Hereinafter, "being equivalent" does not necessarily denote only that the values coincide with each other. The values may be considered to be equivalent to each other even when the values include a minute difference, a manufacturing error, or a measurement error within a range set in advance.

The length L1 of the conductor part C4*a* of the electrode conductor 42 is larger than the length L1 of the conductor part C5*a* of the electrode conductor 52. The length L1 of the conductor part C4*a* of the electrode conductor 42 may be equivalent to the length L1 of the conductor part C5*a* of the electrode conductor 51. The width W2 of the conductor part C4*b* of the electrode conductor 42 is larger than the width W2 of the conductor part C5*b* of the electrode conductor 52. The width W2 of the conductor part C4*b* of the electrode conductor 42 may be equivalent to the width W2 of the conductor part C5*b* of the electrode conductor 51. The length L2 of the conductor part C4*b* of the electrode conductor 42 is larger than the length L2 of the conductor part C5*b* of the electrode conductor 52. The length L2 of the conductor part C4*b* of the electrode conductor 42 may be equivalent to the length L2 of the conductor part C5*b* of the electrode conductor 51.

The electrode conductor 41 and the electrode conductor 42 differ from each other in at least any one dimension of the four dimensions. In the present embodiment, the electrode conductor 41 and the electrode conductor 42 differ from each other in all of the four dimensions. As illustrated in FIGS. 6 and 7, the width W1 of the conductor part C4*a* of the electrode conductor 41 is smaller than the width W1 of the conductor part C4*a* of the electrode conductor 42. The length L1 of the conductor part C4*a* of the electrode conductor 41 is smaller than the length L1 of the conductor part C4*a* of the electrode conductor 42. The width W2 of the conductor part C4*b* of the electrode conductor 41 is smaller than the width W2 of the conductor part C4*b* of the electrode conductor 42. The length L2 of the conductor part C4*b* of the electrode conductor 41 is smaller than the length L2 of the conductor part C4*b* of the electrode conductor 42.

The electrode conductor 51 and the electrode conductor 52 differ from each other in at least any one dimension of the four dimensions. In the present embodiment, the electrode conductor 51 and the electrode conductor 52 differ from each other in all of the four dimensions. As illustrated in FIGS. 6 and 7, the width W1 of the conductor part C5*a* of the electrode conductor 51 is larger than the width W1 of the conductor part C5*a* of the electrode conductor 52. The length L1 of the conductor part C5*a* of the electrode conductor 51 is larger than the length L1 of the conductor part C5*a* of the electrode conductor 52. The width W2 of the conductor part C5*b* of the electrode conductor 51 is larger than the width W2 of the conductor part C5*b* of the electrode conductor 52. The length L2 of the conductor part C5*b* of the electrode conductor 51 is larger than the length L2 of the conductor part C5*b* of the electrode conductor 52.

The electrode conductors 43 and 46 have shapes similar to shape of the electrode conductor 41, and the electrode conductors 44, 45, and 47 have shapes similar to shape of the electrode conductor 42. The electrode conductors 53, 54, and 56 have shapes similar to shape of the electrode conductor 51, and the electrode conductors 55 and 57 have shapes similar to shape of the electrode conductor 52.

As illustrated in FIG. 2, the external electrode 4 includes an end edge 48 in the second direction D2 when viewed in the third direction D3. The end edge 48 is constituted of end edges of the second ends E2 of the conductor parts C4*a* of the plurality of electrode conductors 41 to 47. The end edge 48 has an uneven shape. The length L1 of the conductor part C4*a* of the electrode conductor 41 is smaller than the length L1 of the conductor part C4*a* of the electrode conductor 42 adjacent thereto. Therefore, the end portion in the end edge 48 close to the side surface 2*b* has a recessed shape depressed toward the end surface 2*d*.

As illustrated in FIG. 3, the external electrode 4 includes an end edge 49 in the third direction D3 when viewed in the second direction D2. The end edge 49 is constituted of end edges of the second ends E4 of the conductor parts C4*b* of the plurality of electrode conductors 41 to 47. The end edge 49 has an uneven shape. The length L2 of the conductor part C4*b* of the electrode conductor 41 is smaller than the length L2 of the conductor part C4*b* of the electrode conductor 42 adjacent thereto. Therefore, the end portion in the end edge 49 close to the side surface 2*b* has a recessed shape depressed toward the main surface 2*a*.

As illustrated in FIG. 2, the external electrode 5 includes an end edge 58 in the second direction D2 when viewed in the third direction D3. The end edge 58 is constituted of end edges of the second ends E2 of the conductor parts C5*a* of the plurality of electrode conductors 51 to 57. The end edge 58 has an uneven shape. The length L1 of the conductor part C5*a* of the electrode conductor 51 is larger than the length L1 of the conductor part C5*a* of the electrode conductor 52 adjacent thereto. Therefore, the end portion in the end edge 58 close to the side surface 2*b* has a projecting shape protruding toward the end surface 2*d*.

As illustrated in FIG. 4, the external electrode 5 includes an end edge 59 in the third direction D3 when viewed in the second direction D2. The end edge 59 is constituted of end edges of the second ends E4 of the conductor parts C5*b* of the plurality of electrode conductors 51 to 57. The end edge 59 has an uneven shape. The length L2 of the conductor part C5*b* of the electrode conductor 51 is larger than the length L2 of the conductor part C5*b* of the electrode conductor 52 adjacent thereto. Therefore, the end portion in the end edge 59 close to the side surface 2*b* has a projecting shape protruding to a side opposite to the main surface 2*a*.

The electrode conductor 41 differs from the electrode conductor 51 positioned in the same layer and the electrode conductor 42 adjacent thereto in the first direction D1 in shape. The electrode conductor 51 differs from the electrode conductor 52 adjacent thereto in the first direction D1 in shape. The electrode conductor 42 differs from the electrode conductor 52 positioned in the same layer in shape. Therefore, surfaces of the external electrode 4 and the external electrode 5 opposing the element body 2 have a complicated shape. Surfaces opposing the element body 2 are surfaces coming into contact with the element body 2. Accordingly, an area of the external electrode 4 in contact with the element body 2 and an area of the external electrode 5 in contact with the element body 2 increase. Therefore, fixing strengths of the external electrode 4 and the external electrode 5 with respect to the element body 2 are improved.

The width W1 of the conductor part C4*a* of the electrode conductor 41 is smaller than the width W1 of the conductor part C4*a* of the electrode conductor 42. The length L1 of the conductor part C4*a* of the electrode conductor 41 is smaller than the length L1 of the conductor part C4*a* of the electrode conductor 42. The width W2 of the conductor part C4*b* of the electrode conductor 41 is smaller than the width W2 of the conductor part C4*b* of the electrode conductor 42. The length L2 of the conductor part C4*b* of the electrode conductor 41 is smaller than the length L2 of the conductor part C4*b* of the electrode conductor 42. Therefore, a surface of the external electrode 4 opposing the element body 2 has a more complicated shape, and the area of the external electrode 4 in contact with the element body 2 further increases. As a result, the fixing strength of the external electrode 4 with respect to the element body 2 is further improved.

The width W1 of the conductor part C4*a* of the electrode conductor 41 is smaller than the width W1 of the conductor part C5*a* of the electrode conductor 51. The length L1 of the conductor part C4*a* of the electrode conductor 41 is smaller than the length L1 of the conductor part C5*a* of the electrode conductor 51. The width W2 of the conductor part C4*b* of the electrode conductor 41 is smaller than the width W2 of the conductor part C5*b* of the electrode conductor 51. The length L2 of the conductor part C4*b* of the electrode conductor 41 is smaller than the length L2 of the conductor part C5*b* of the electrode conductor 51. Therefore, the surfaces of the external electrode 4 and the external electrode 5 opposing the element body 2 have a more complicated shape, and the area of the external electrode 4 in contact with the element body 2 and the area of the external electrode 5 in contact with the element body 2 further increase. As a result, the fixing strengths of the external electrode 4 and the external electrode 5 with respect to the element body 2 are further improved.

Second Embodiment

Figure 8:
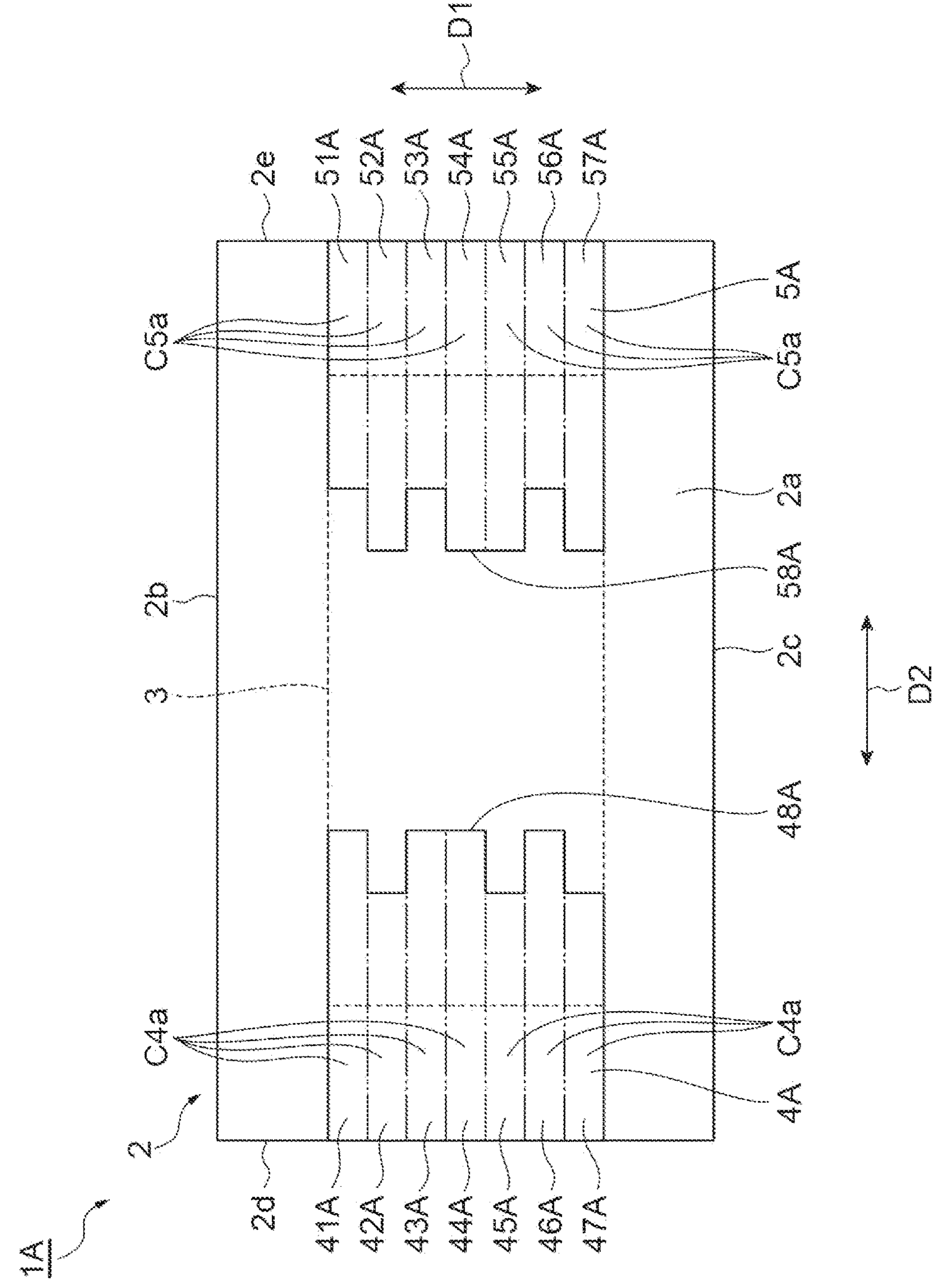
FIG. 8 is a plan view of a multilayer coil component according to a second embodiment viewed from the main surface side.
Figure 9:
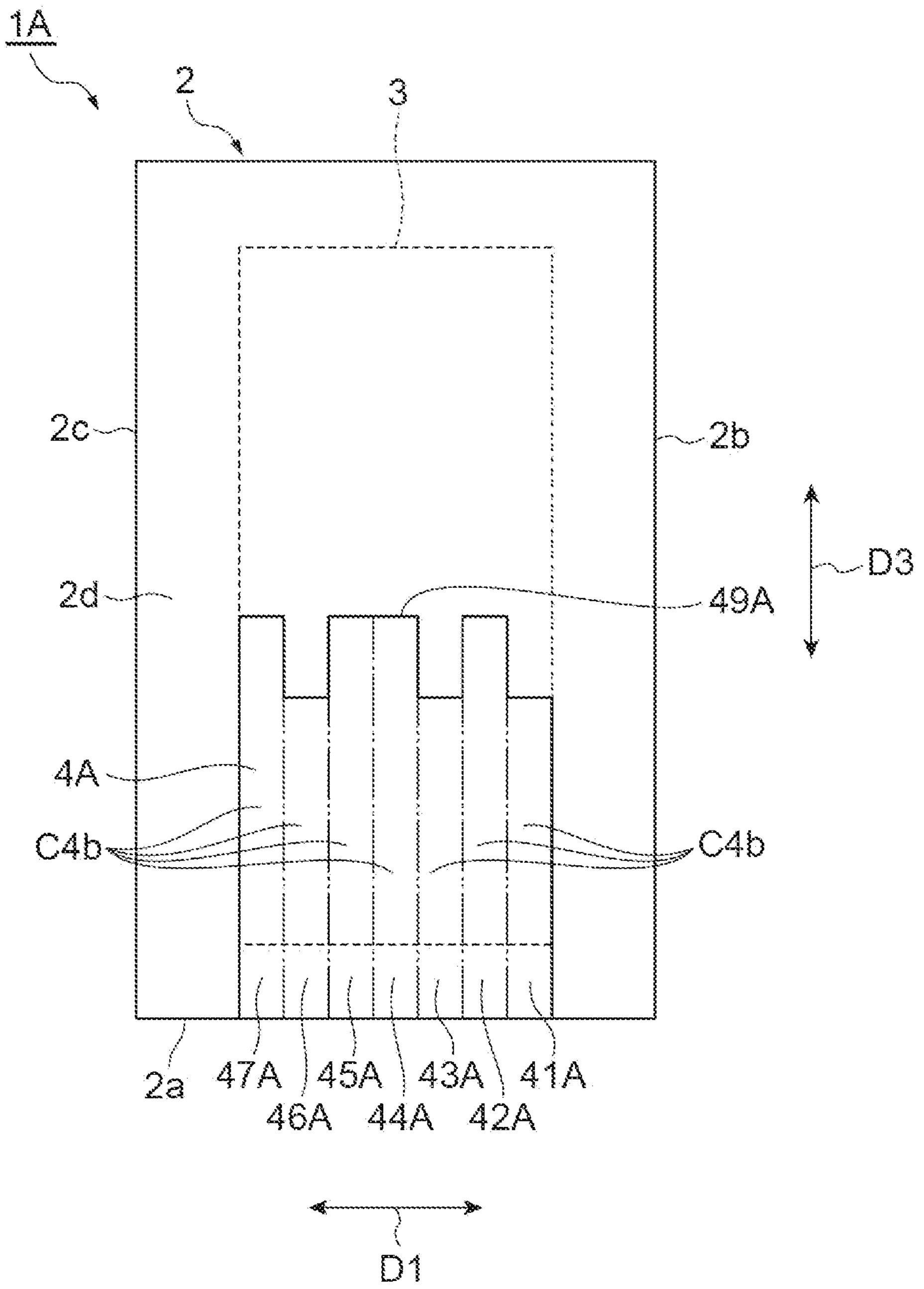
FIG. 9 is a plan view of the multilayer coil component according to the second embodiment viewed from one end surface side.
Figure 10:
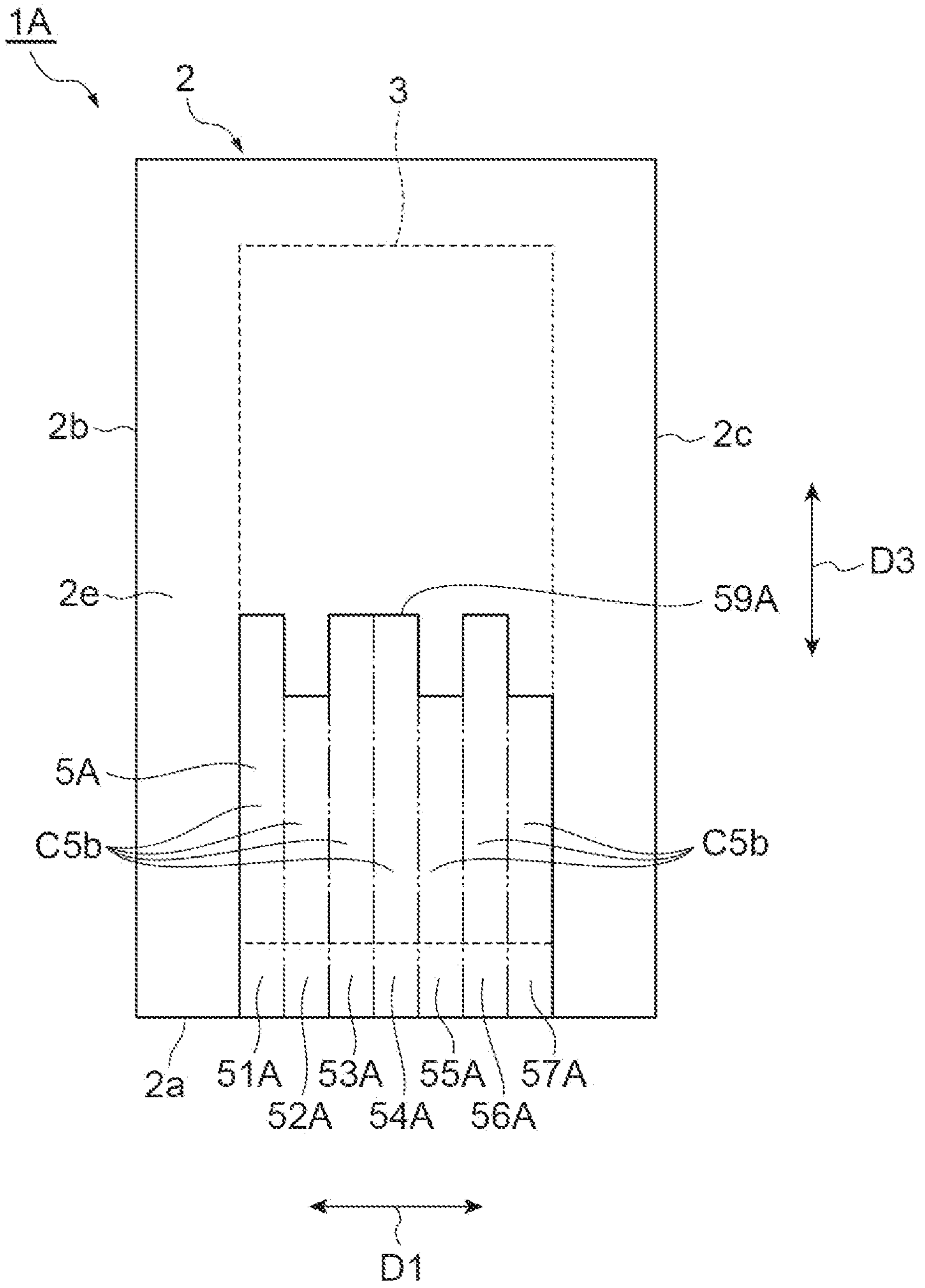
FIG. 10 is a plan view of the multilayer coil component according to the second embodiment viewed from the other end surface side.
Figure 11:
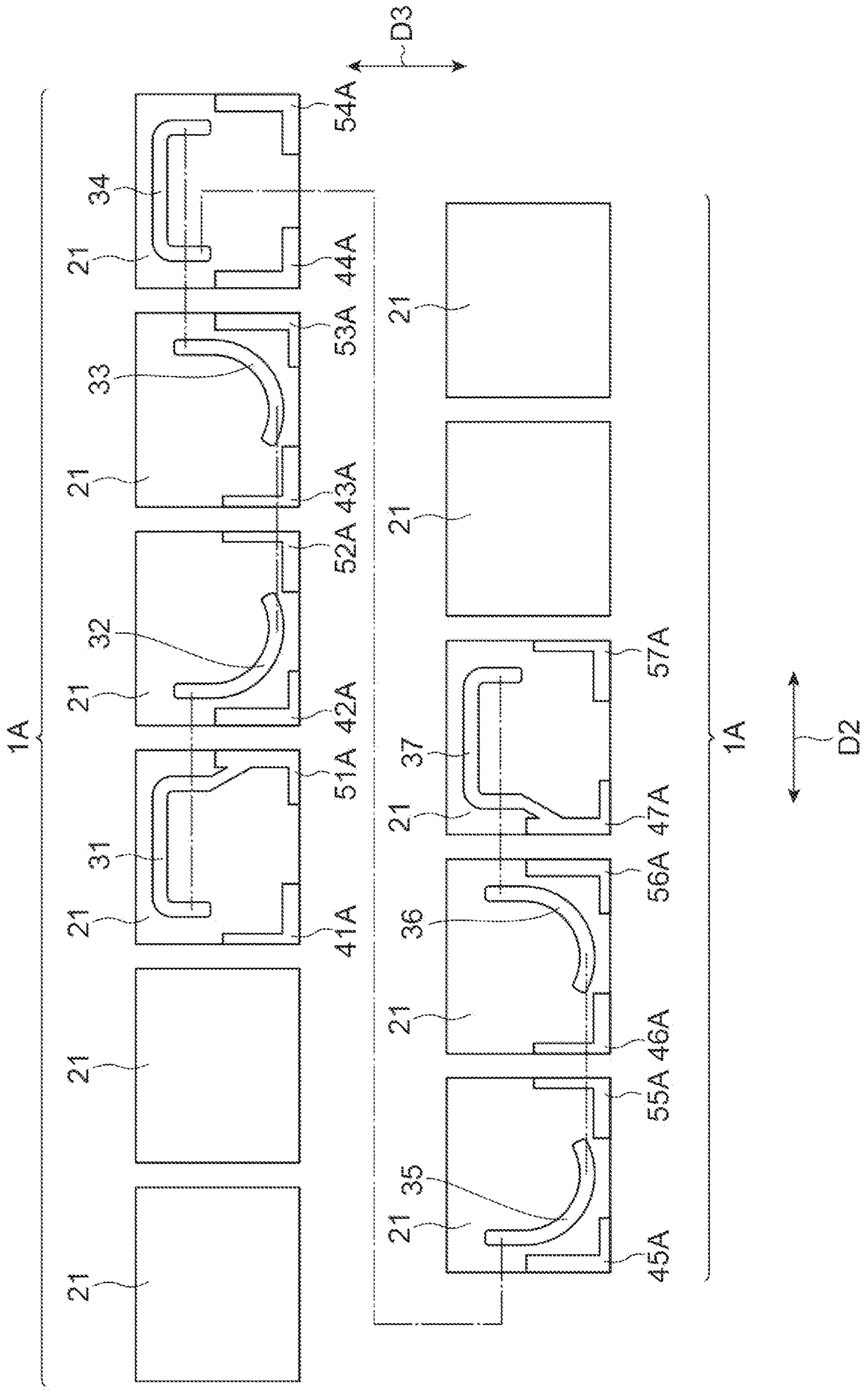
FIG. 11 is an exploded view illustrating a constitution of the multilayer coil component according to the second embodiment.
Figure 12:
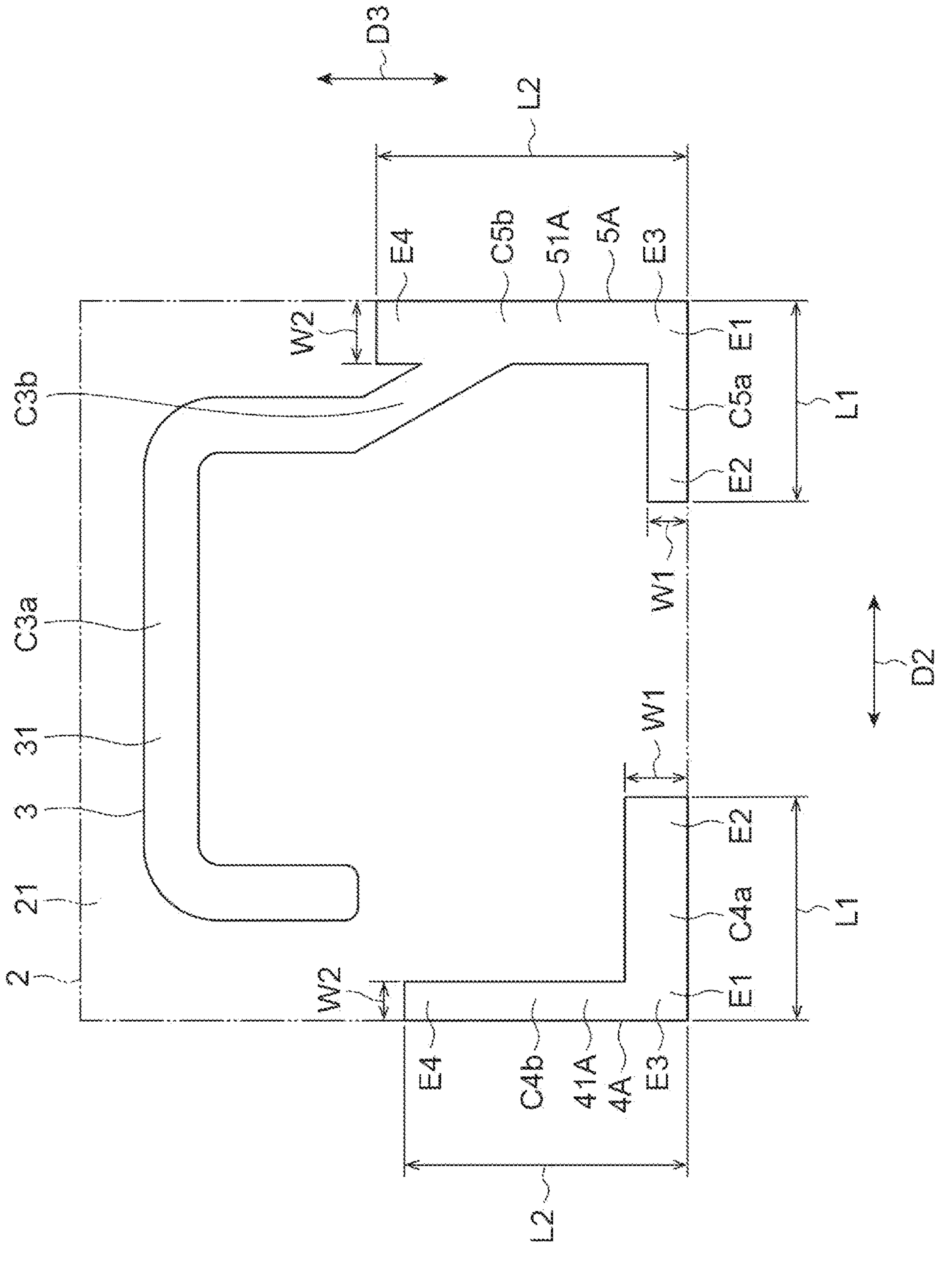
FIG. 12 is a view illustrating a constitution of electrode conductors.
Figure 13:
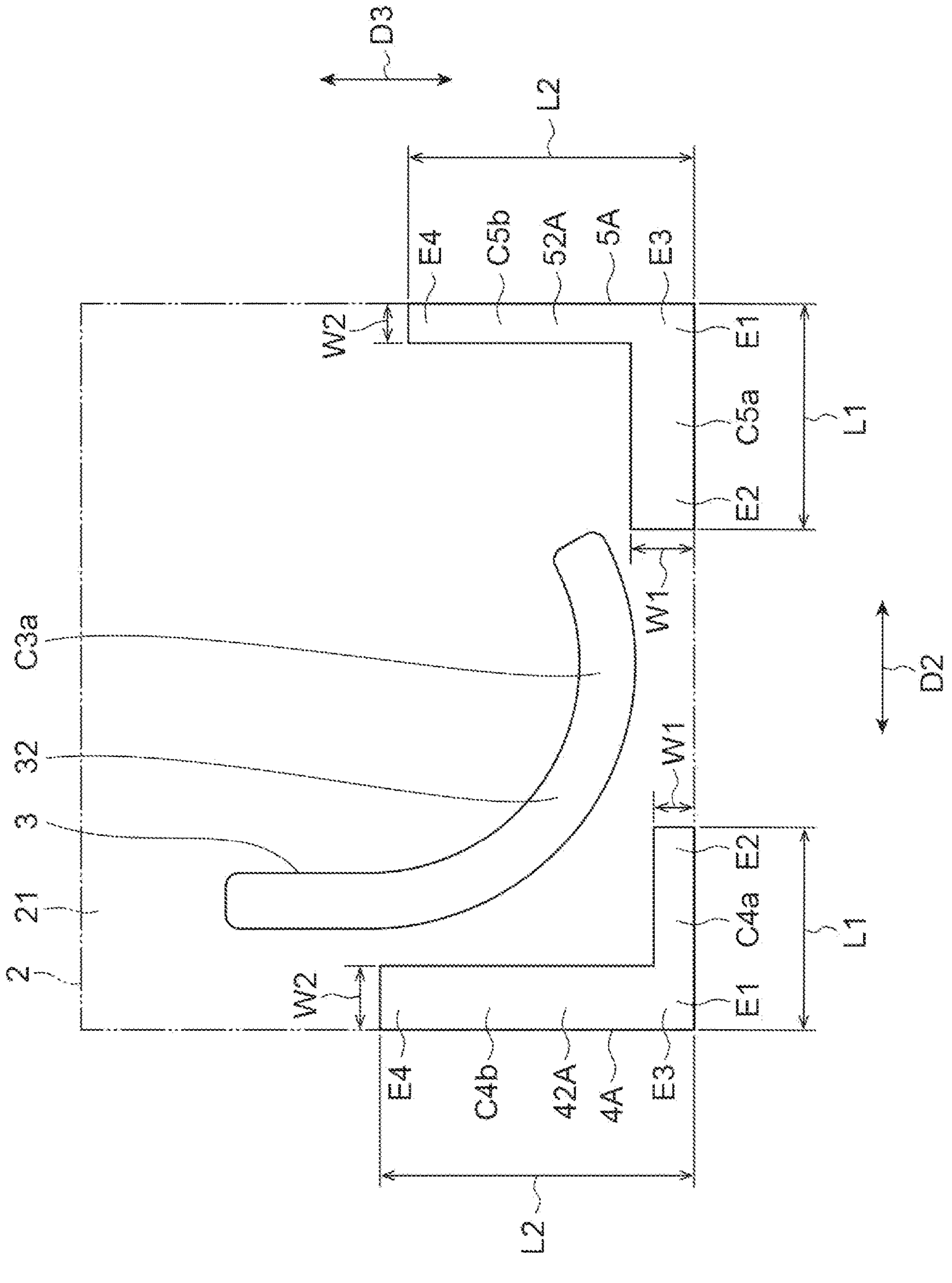
FIG. 13 is a view illustrating a constitution of other electrode conductors.
Figure 14:
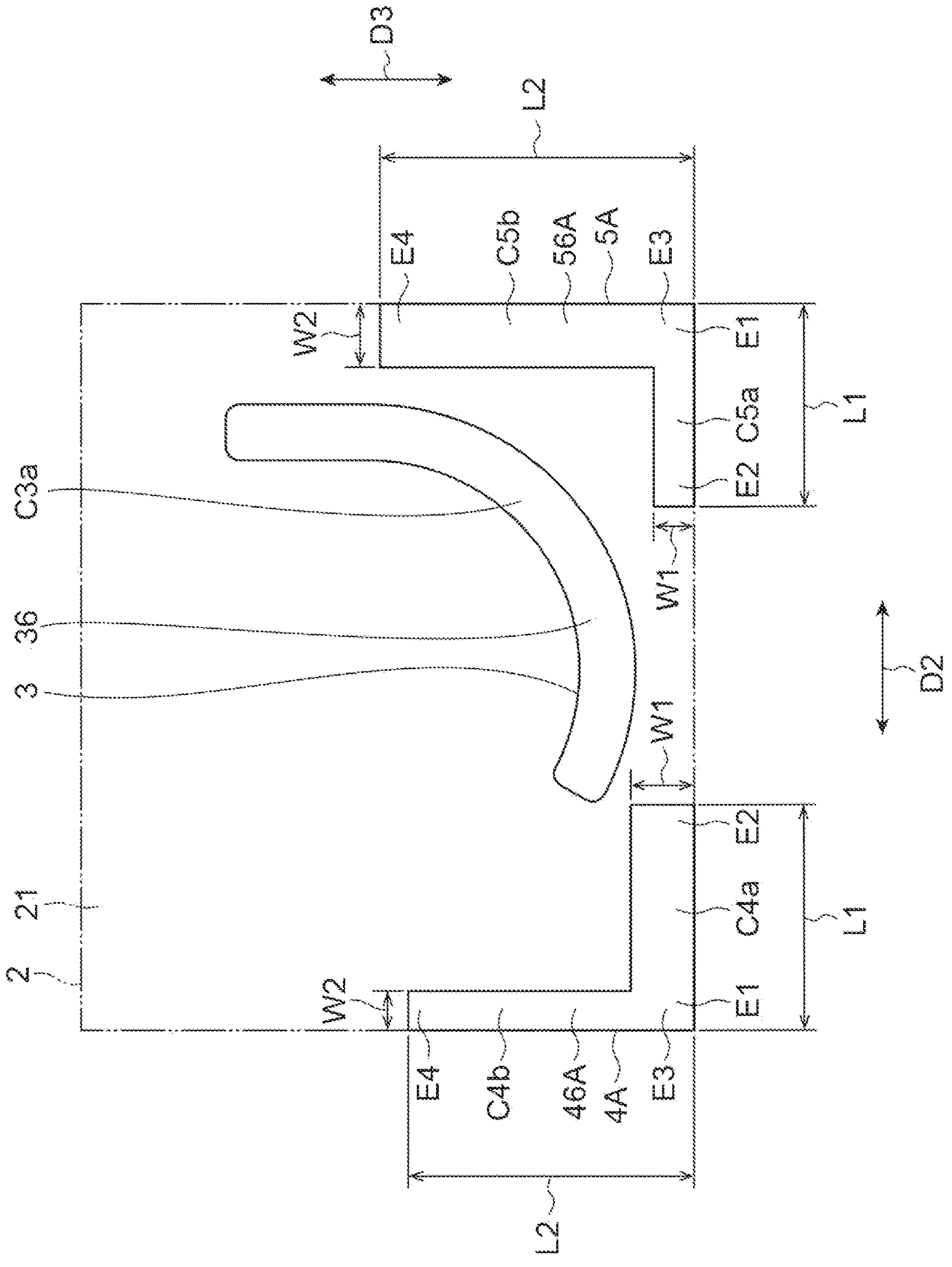
FIG. 14 is a view illustrating a constitution of other electrode conductors.
Figure 15:
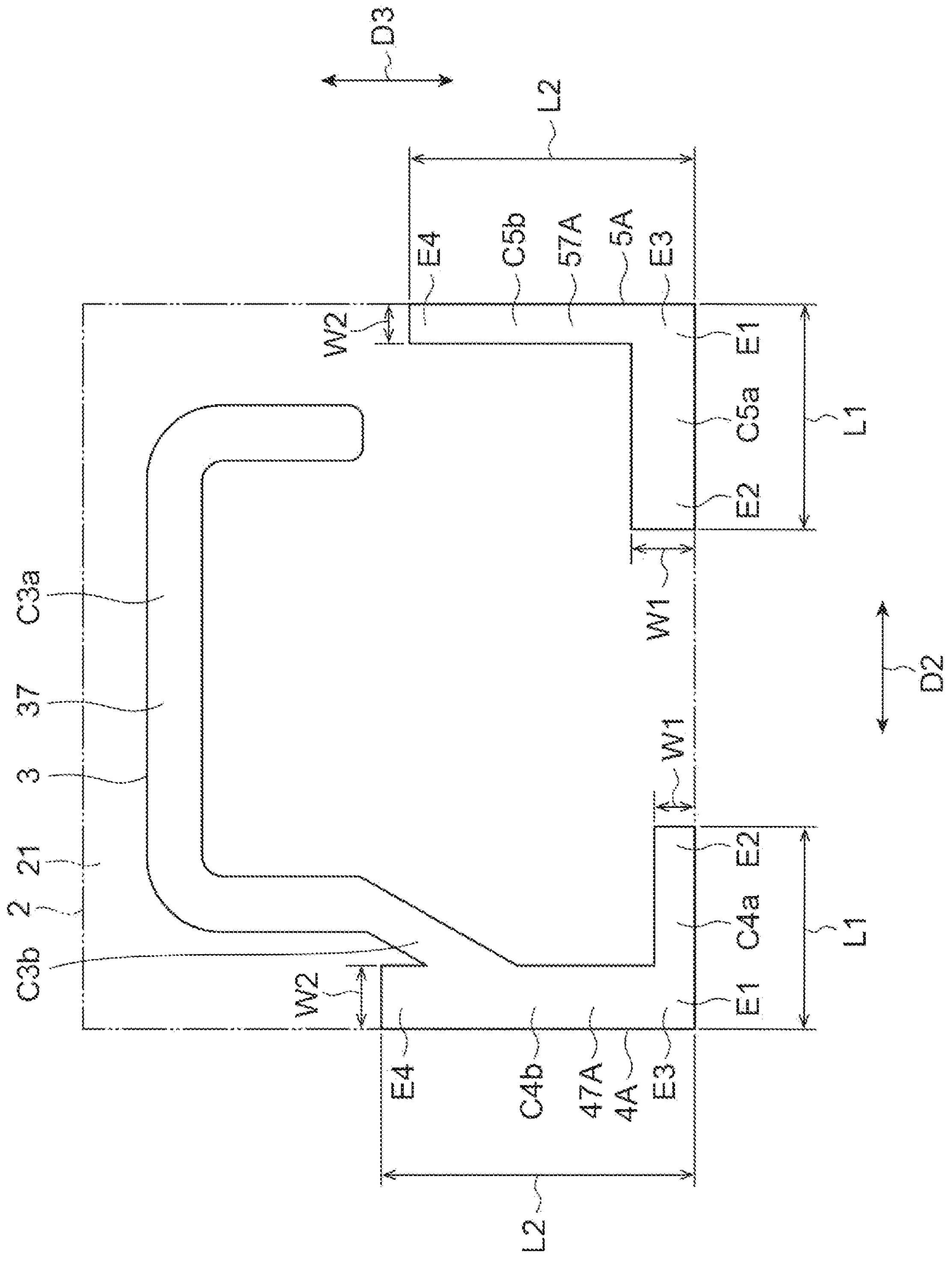
FIG. 15 is a view illustrating a constitution of other electrode conductors.

A multilayer coil component 1A will be described with reference to FIGS. 8 to 15. FIG. 8 is a plan view of the multilayer coil component 1A viewed from the main surface 2*a* side. FIG. 9 is a plan view of the multilayer coil component 1A viewed from the end surface 2*d* side. FIG. 10 is a plan view of the multilayer coil component 1A viewed from the end surface 2*e* side. FIG. 11 is an exploded view illustrating a constitution of the multilayer coil component 1A. FIG. 12 is a view illustrating a constitution of electrode conductors 41A and 51A. FIG. 13 is a view illustrating a constitution of electrode conductors 42A and 52A. FIG. 14 is a view illustrating a constitution of electrode conductors 46A and 56A. FIG. 15 is a view illustrating a constitution of electrode conductors 47A and 57A. A second embodiment differs from the first embodiment described above in constitution of the electrode conductors of the external electrode. Hereinafter, differences between the first embodiment described above and the second embodiment will be mainly described. The multilayer coil component 1A includes the element body 2, the coil 3, and a pair of external electrodes 4A and 5A.

The external electrode 4A includes a plurality of electrode conductors 41A to 47A. The electrode conductor 41A, the electrode conductor 42A, the electrode conductor 43A, the electrode conductor 44A, the electrode conductor 45A, the electrode conductor 46A, and the electrode conductor 47A are stacked in a direction toward the side surface 2*c* from the side surface 2*b* in this order. The plurality of electrode conductors 41A to 47A are arranged in the first direction D1, that is, the coil axis direction of the coil 3. The electrode conductor 41A and the electrode conductor 42A are adjacent to each other in the first direction D1. For example, when the electrode conductor 41A constitutes a first electrode conductor, the electrode conductor 42A constitutes a second electrode conductor. The electrode conductor 46A and the electrode conductor 47A are adjacent to each other in the first direction D1. For example, when the electrode conductor 46A constitutes a sixth electrode conductor, the electrode conductor 47A constitutes a fifth electrode conductor.

The electrode conductor 41A and the electrode conductor 47A are outermost electrode conductors positioned on the outermost sides in the first direction D1 of the plurality of electrode conductors 41A to 47A. The electrode conductor 41A and the electrode conductor 47A are positioned at the ends of the external electrode 4A in the first direction D1. The electrode conductor 41A is closest to the side surface 2*b* of the plurality of electrode conductors 41A to 47A. The electrode conductor 47A is closest to the side surface 2*c* of the plurality of electrode conductors 41A to 47A. The electrode conductor 41A is positioned in the same layer as the coil conductor 31. The electrode conductor 47A is positioned in the same layer as the coil conductor 37. The plurality of electrode conductors 42A to 46A are positioned between the electrode conductor 41A and the electrode conductor 47A in the first direction D1. The plurality of electrode conductors 42A to 46A are positioned in the same layer as the plurality of coil conductors 32 to 36. Each of the plurality of electrode conductors 41A to 47A includes the conductor part C4*a* and the conductor part C4*b*.

The external electrode 5A includes a plurality of electrode conductors 51A to 57A. The electrode conductor 51A, the electrode conductor 52A, the electrode conductor 53A, the electrode conductor 54A, the electrode conductor 55A, the electrode conductor 56A, and the electrode conductor 57A are stacked in a direction toward the side surface 2*c* from the side surface 2*b* in this order. The plurality of electrode conductors 51A to 57A are arranged in the first direction D1, that is, the coil axis direction of the coil 3. The electrode conductor 51A and the electrode conductor 52A are adjacent to each other in the first direction D1. The electrode conductor 51A is positioned in the same layer as the electrode conductor 41A, and the electrode conductor 52A is positioned in the same layer as the electrode conductor 42A. For example, when the electrode conductor 51A constitutes a third electrode conductor, the electrode conductor 52A constitutes a fourth electrode conductor. The electrode conductor 56A and the electrode conductor 57A are adjacent to each other in the first direction D1. The electrode conductor 56A is positioned in the same layer as the electrode conductor 46A, and the electrode conductor 57A is positioned in the same layer as the electrode conductor 47A. For example, when the electrode conductor 56A constitutes an eighth electrode conductor, the electrode conductor 57A constitutes a seventh electrode conductor.

The electrode conductor 51A and the electrode conductor 57A are outermost electrode conductors positioned on the outermost sides in the first direction D1 of the plurality of electrode conductors 51A to 57A. The electrode conductor 51A and the electrode conductor 57A are positioned at the ends of the external electrode 5A in the first direction D1. The electrode conductor 51A is closest to the side surface 2*b* of the plurality of electrode conductors 51A to 57A. The electrode conductor 57A is closest to the side surface 2*c* of the plurality of electrode conductors 51A to 57A. The electrode conductor 51A is positioned in the same layer as the coil conductor 31. The electrode conductor 57A is positioned in the same layer as the coil conductor 37. The plurality of electrode conductors 52A to 56A are positioned between the electrode conductor 51A and the electrode conductor 57A in the first direction D1. The plurality of electrode conductors 52A to 56A are positioned in the same layer as the plurality of coil conductors 32 to 36. Each of the plurality of electrode conductors 51A to 57A includes the conductor part C5*a* and the conductor part C5*b*.

As illustrated in FIG. 12, the width W1 of the conductor part C4*a* of the electrode conductor 41A is larger than the width W1 of the conductor part C5*a* of the electrode conductor 51A. The length L1 of the conductor part C4*a* of the electrode conductor 41A is larger than the length L1 of the conductor part C5*a* of the electrode conductor 51A. The width W2 of the conductor part C4*b* of the electrode conductor 41A is smaller than the width W2 of the conductor part C5*b* of the electrode conductor 51A. The length L2 of the conductor part C4*b* of the electrode conductor 41A is smaller than the length L2 of the conductor part C5*b* of the electrode conductor 51A.

As illustrated in FIG. 13, the width W1 of the conductor part C4*a* of the electrode conductor 42A is smaller than the width W1 of the conductor part C5*a* of the electrode conductor 52A. The length L1 of the conductor part C4*a* of the electrode conductor 42A is smaller than the length L1 of the conductor part C5*a* of the electrode conductor 52A. The width W2 of the conductor part C4*b* of the electrode conductor 42A is larger than the width W2 of the conductor part C5*b* of the electrode conductor 52A. The length L2 of the conductor part C4*b* of the electrode conductor 42A is larger than the length L2 of the conductor part C5*b* of the electrode conductor 52A.

As illustrated in FIGS. 12 and 13, the width W1 of the conductor part C4*a* of the electrode conductor 41A is larger than the width W1 of the conductor part C4*a* of the electrode conductor 42A. The length L1 of the conductor part C4*a* of the electrode conductor 41A is larger than the length L1 of the conductor part C4*a* of the electrode conductor 42A. The width W2 of the conductor part C4*b* of the electrode conductor 41A is smaller than the width W2 of the conductor part C4*b* of the electrode conductor 42A. The length L2 of the conductor part C4*b* of the electrode conductor 41A is smaller than the length L2 of the conductor part C4*b* of the electrode conductor 42A.

As illustrated in FIGS. 12 and 13, the width W1 of the conductor part C5*a* of the electrode conductor 51A is smaller than the width W1 of the conductor part C5*a* of the electrode conductor 52A. The length L1 of the conductor part C5*a* of the electrode conductor 51A is smaller than the length L1 of the conductor part C5*a* of the electrode conductor 52A. The width W2 of the conductor part C5*b* of the electrode conductor 51A is larger than the width W2 of the conductor part C5*b* of the electrode conductor 52A. The length L2 of the conductor part C5*b* of the electrode conductor 51A is larger than the length L2 of the conductor part C5*b* of the electrode conductor 52A.

As illustrated in FIG. 14, the width W1 of the conductor part C4*a* of the electrode conductor 46A is larger than the width W1 of the conductor part C5*a* of the electrode conductor 56A. The length L1 of the conductor part C4*a* of the electrode conductor 46A is larger than the length L1 of the conductor part C5*a* of the electrode conductor 56A. The width W2 of the conductor part C4*b* of the electrode conductor 46A is smaller than the width W2 of the conductor part C5*b* of the electrode conductor 56A. The length L2 of the conductor part C4*b* of the electrode conductor 46A is smaller than the length L2 of the conductor part C5*b* of the electrode conductor 56A.

As illustrated in FIG. 15, the width W1 of the conductor part C4*a* of the electrode conductor 47A is smaller than the width W1 of the conductor part C5*a* of the electrode conductor 57A. The length L1 of the conductor part C4*a* of the electrode conductor 47A is smaller than the length L1 of the conductor part C5*a* of the electrode conductor 57A. The width W2 of the conductor part C4*b* of the electrode conductor 47A is larger than the width W2 of the conductor part C5*b* of the electrode conductor 57A. The length L2 of the conductor part C4*b* of the electrode conductor 47A is larger than the length L2 of the conductor part C5*b* of the electrode conductor 57A.

As illustrated in FIGS. 14 and 15, the width W1 of the conductor part C4*a* of the electrode conductor 47A is smaller than the width W1 of the conductor part C4*a* of the electrode conductor 46A. The length L1 of the conductor part C4*a* of the electrode conductor 47A is smaller than the length L1 of the conductor part C4*a* of the electrode conductor 46A. The width W2 of the conductor part C4*b* of the electrode conductor 47A is larger than the width W2 of the conductor part C4*b* of the electrode conductor 46A. The length L2 of the conductor part C4*b* of the electrode conductor 47A is larger than the length L2 of the conductor part C4*b* of the electrode conductor 46A.

As illustrated in FIGS. 14 and 15, the width W1 of the conductor part C5*a* of the electrode conductor 57A is larger than the width W1 of the conductor part C5*a* of the electrode conductor 56A. The length L1 of the conductor part C5*a* of the electrode conductor 57A is larger than the length L1 of the conductor part C5*a* of the electrode conductor 56A. The width W2 of the conductor part C5*b* of the electrode conductor 57A is smaller than the width W2 of the conductor part C5*b* of the electrode conductor 56A. The length L2 of the conductor part C5*b* of the electrode conductor 57A is smaller than the length L2 of the conductor part C5*b* of the electrode conductor 56A.

The electrode conductors 43A and 46A have shapes similar to shape of the electrode conductor 41A, and the electrode conductors 45A and 47A have shapes similar to shape of the electrode conductor 42A. The electrode conductors 53A and 56A have shapes similar to shape of the electrode conductor 51A, and the electrode conductors 55A and 57A have shapes similar to shape of the electrode conductor 52A.

As illustrated in FIG. 8, an end edge 48A of the external electrode 4A has an uneven shape. The length L1 of the conductor part C4*a* of the electrode conductor 41A is larger than the length L1 of the conductor part C4*a* of the electrode conductor 42A adjacent thereto. The length L1 of the conductor part C4*a* of the electrode conductor 47A is smaller than the length L1 of the conductor part C4*a* of the electrode conductor 46A adjacent thereto. Accordingly, the shape of the end portion in the end edge 48A close to the side surface 2*b* differs from the shape of the end portion in the end edge 48A close to the side surface 2*c*. The end portion in the end edge 48A close to the side surface 2*b* has a projecting shape protruding toward the end surface 2*e*, and the end portion in the end edge 48A close to the side surface 2*c* has a recessed shape depressed toward the end surface 2*d*.

As illustrated in FIG. 9, an end edge 49A of the external electrode 4A has an uneven shape. The length L2 of the conductor part C4*b* of the electrode conductor 41A is smaller than the length L2 of the conductor part C4*b* of the electrode conductor 42A adjacent thereto. The length L2 of the conductor part C4*b* of the electrode conductor 47A is larger than the length L2 of the conductor part C4*b* of the electrode conductor 46A adjacent thereto. The shape of the end portion in the end edge 49A close to the side surface 2*b* differs from the shape of the end portion in the end edge 49A close to the side surface 2*c*. The end portion in the end edge 49A on the side surface 2*b* side has a recessed shape depressed toward the main surface 2*a*, and the end portion in the end edge 49A on the side surface 2*c* side has a projecting shape protruding toward a side opposite to the main surface 2*a*. The shape of the end portion in the end edge 49A close to the side surface 2*b* differs from the shape of the end portion in the end edge 48A close to the side surface 2*b*. The shape of the end portion in the end edge 49A close to the side surface 2*c* differs from the shape of the end portion in the end edge 48A close to the side surface 2*c*.

As illustrated in FIG. 8, an end edge 58A of the external electrode 5A has an uneven shape. The length L1 of the conductor part C5*a* of the electrode conductor 51A is smaller than the length L1 of the conductor part C5*a* of the electrode conductor 52A adjacent thereto. The length L1 of the conductor part C5*a* of the electrode conductor 57A is larger than the length L1 of the conductor part C5*a* of the electrode conductor 56A adjacent thereto. The shape of the end portion in the end edge 58A close to the side surface 2*b* differs from the shape of the end portion in the end edge 58A close to the side surface 2*c*. The end portion in the end edge 58A close to the side surface 2*b* has a recessed shape depressed toward the end surface 2*e*, and the end portion in the end edge 58A close to the side surface 2*c* has a projecting shape protruding toward the end surface 2*d*.

As illustrated in FIG. 10, an end edge 59A of the external electrode 5A has an uneven shape. The length L2 of the conductor part C5*b* of the electrode conductor 51A is larger than the length L2 of the conductor part C5*b* of the electrode conductor 52A adjacent thereto. The length L2 of the conductor part C5*b* of the electrode conductor 57A is smaller than the length L2 of the conductor part C5*b* of the electrode conductor 56A adjacent thereto. The shape of the end portion in the end edge 59A close to the side surface 2*b* differs from the shape of the end portion in the end edge 59A close to the side surface 2*c*. The end portion in the end edge 59A close to the side surface 2*b* has a projecting shape protruding toward a side opposite to the main surface 2*a*, and the end portion in the end edge 59A close to the side surface 2*c* has a recessed shape depressed toward the main surface 2*a*. The shape of the end portion in the end edge 59A close to the side surface 2*b* differs from the shape of the end portion in the end edge 58A close to the side surface 2*b*. The shape of the end portion in the end edge 59A close to the side surface 2*c* differs from the shape of the end portion in the end edge 58A close to the side surface 2*c*.

The width W1 of the conductor part C4*a* of the electrode conductor 41A is larger than the width W1 of the conductor part C4*a* of the electrode conductor 42A. The length L1 of the conductor part C4*a* of the electrode conductor 41A is larger than the length L1 of the conductor part C4*a* of the electrode conductor 42A. The width W2 of the conductor part C4*b* of the electrode conductor 41A is smaller than the width W2 of the conductor part C4*b* of the electrode conductor 42A. The length L2 of the conductor part C4*b* of the electrode conductor 41A is smaller than the length L2 of the conductor part C4*b* of the electrode conductor 42A. Therefore, a surface of the external electrode 4A opposing the element body 2 has a more complicated shape, and the area of the external electrode 4A in contact with the element body 2 further increases. As a result, the fixing strength of the external electrode 4A with respect to the element body 2 is further improved.

The width W1 of the conductor part C4*a* of the electrode conductor 41A is larger than the width W1 of the conductor part C5*a* of the electrode conductor 51A. The length L1 of the conductor part C4*a* of the electrode conductor 41A is larger than the length L1 of the conductor part C5*a* of the electrode conductor 51A. The width W2 of the conductor part C4*b* of the electrode conductor 41A is smaller than the width W2 of the conductor part C5*b* of the electrode conductor 51A. The length L2 of the conductor part C4*b* of the electrode conductor 41A is smaller than the length L2 of the conductor part C5*b* of the electrode conductor 51A. Therefore, surfaces of the external electrode 4A and the external electrode 5A opposing the element body 2 may have a more complicated shape. When the surfaces of the external electrode 4A and the external electrode 5A opposing the element body 2 have a more complicated shape, the area of the external electrode 4A in contact with the element body 2 and the area of the external electrode 5A in contact with the element body 2 further increase. As a result, the fixing strengths of the external electrode 4A and the external electrode 5A with respect to the element body 2 are further improved.

The electrode conductor 47A and the electrode conductor 57A differ from each other in at least any one dimension of the four dimensions. The electrode conductor 46A and the electrode conductor 56A differ from each other in at least any one dimension of the four dimensions. The electrode conductor 47A and the electrode conductor 46A differ from each other in at least any one dimension of the four dimensions. The electrode conductor 57A and the electrode conductor 56A differ from each other in at least any one dimension of the four dimensions. Therefore, the electrode conductor 47A differs from the electrode conductor 57A positioned in the same layer and the electrode conductor 46A adjacent thereto in the first direction D1 in shape. The electrode conductor 57A differs from the electrode conductor 56A adjacent thereto in the first direction D1 in shape. The electrode conductor 46A differs from the electrode conductor 56A positioned in the same layer in shape. In this case, surfaces of the external electrode 4A and the external electrode 5A opposing the element body 2 have a more complicated shape. Accordingly, the area of the external electrode 4A in contact with the element body 2 and the area of the external electrode 5A in contact with the element body 2 further increase. Thus, the fixing strengths of the external electrode 4A and the external electrode 5A with respect to the element body 2 are further improved.

The length L1 of the conductor part C4*a* of the electrode conductor 41A is larger than the length L1 of the conductor part C4*a* of the electrode conductor 42A. The length L2 of the conductor part C4*b* of the electrode conductor 41A is smaller than the length L2 of the conductor part C4*b* of the electrode conductor 42A. The length L1 of the conductor part C4*a* of the electrode conductor 47A is smaller than the length L1 of the conductor part C4*a* of the electrode conductor 46A. The length L2 of the conductor part C4*b* of the electrode conductor 47A is larger than the length L2 of the conductor part C4*b* of the electrode conductor 46. Therefore, a surface of the external electrode 4A opposing the element body 2 has a more complicated shape, and the area of the external electrode 4A in contact with the element body 2 further increases. As a result, the fixing strength of the external electrode 4A with respect to the element body 2 is further improved.

Third Embodiment

Figure 16:
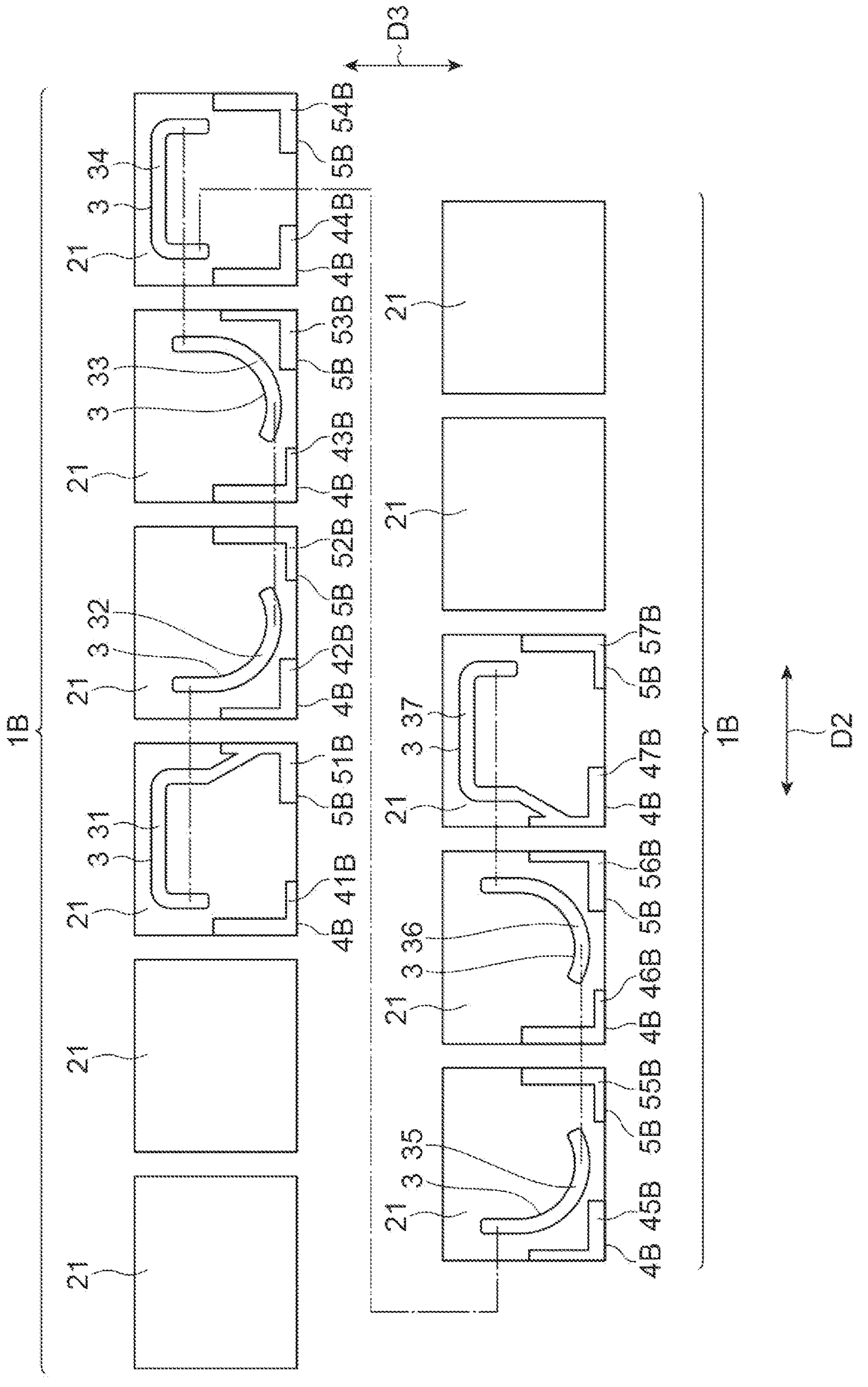
FIG. 16 is an exploded view illustrating a constitution of a multilayer coil component according to a third embodiment.
Figure 17:
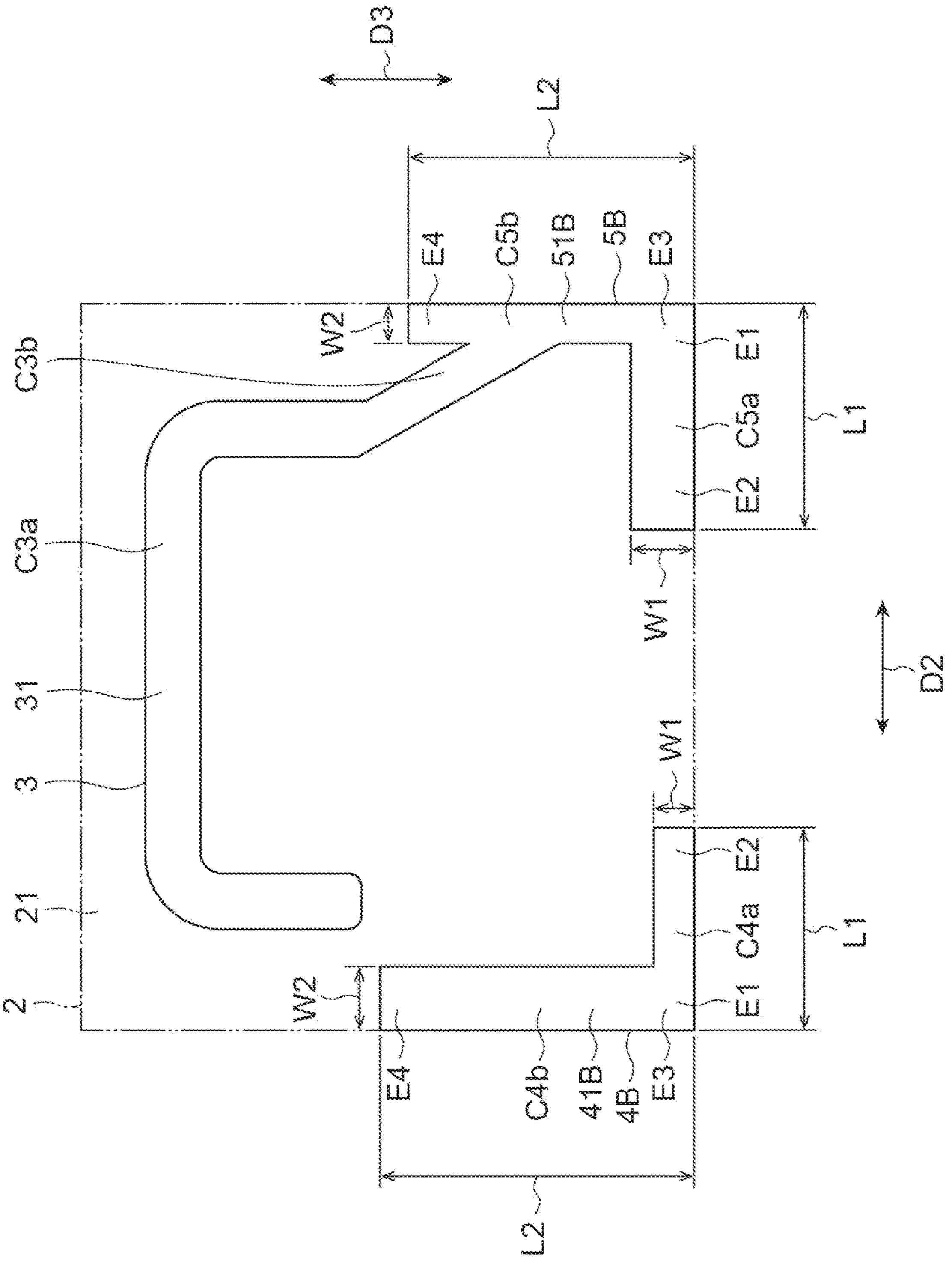
FIG. 17 is a view illustrating a constitution of electrode conductors.
Figure 18:
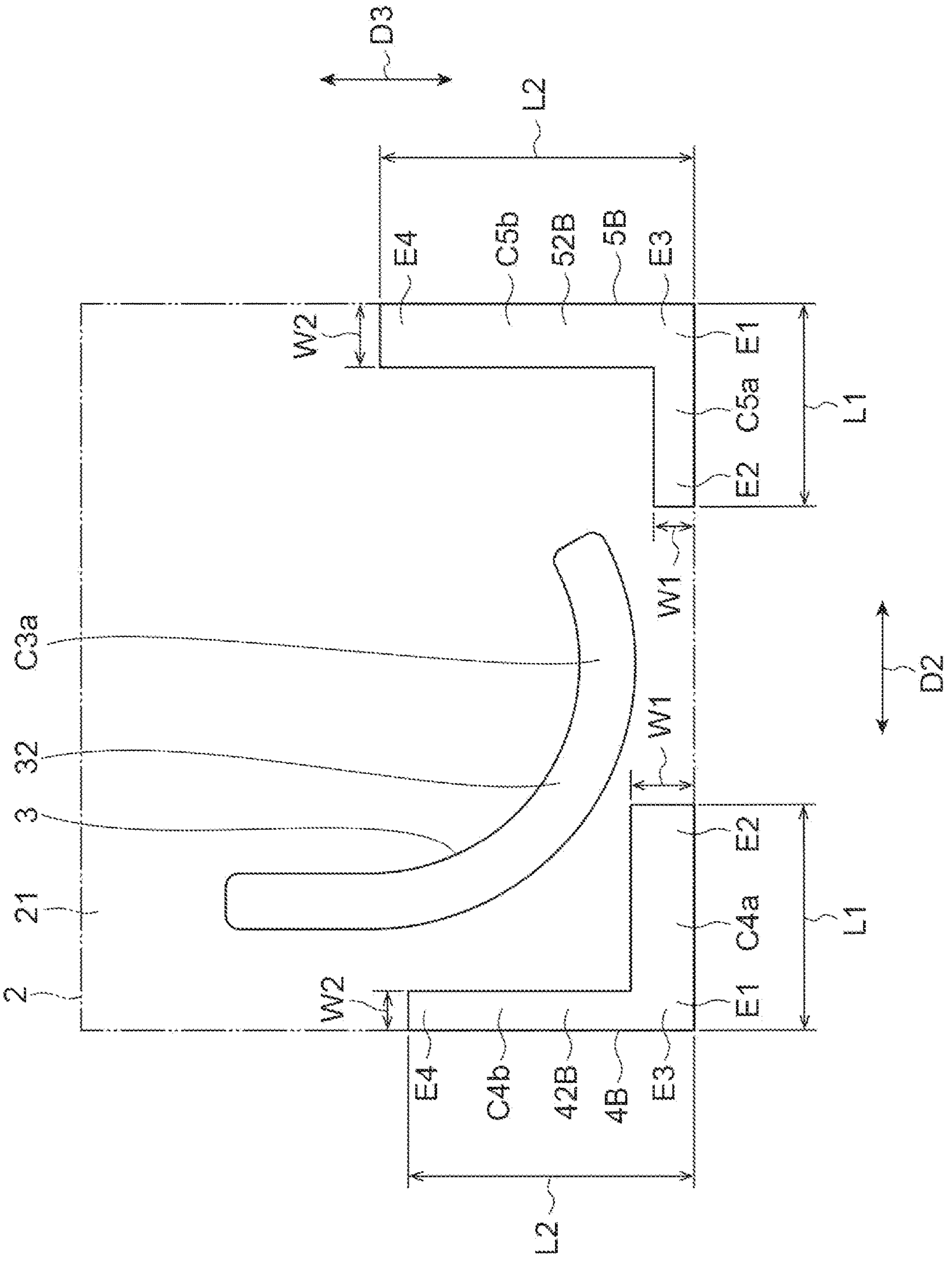
FIG. 18 is a view illustrating a constitution of other electrode conductors.
Figure 19:
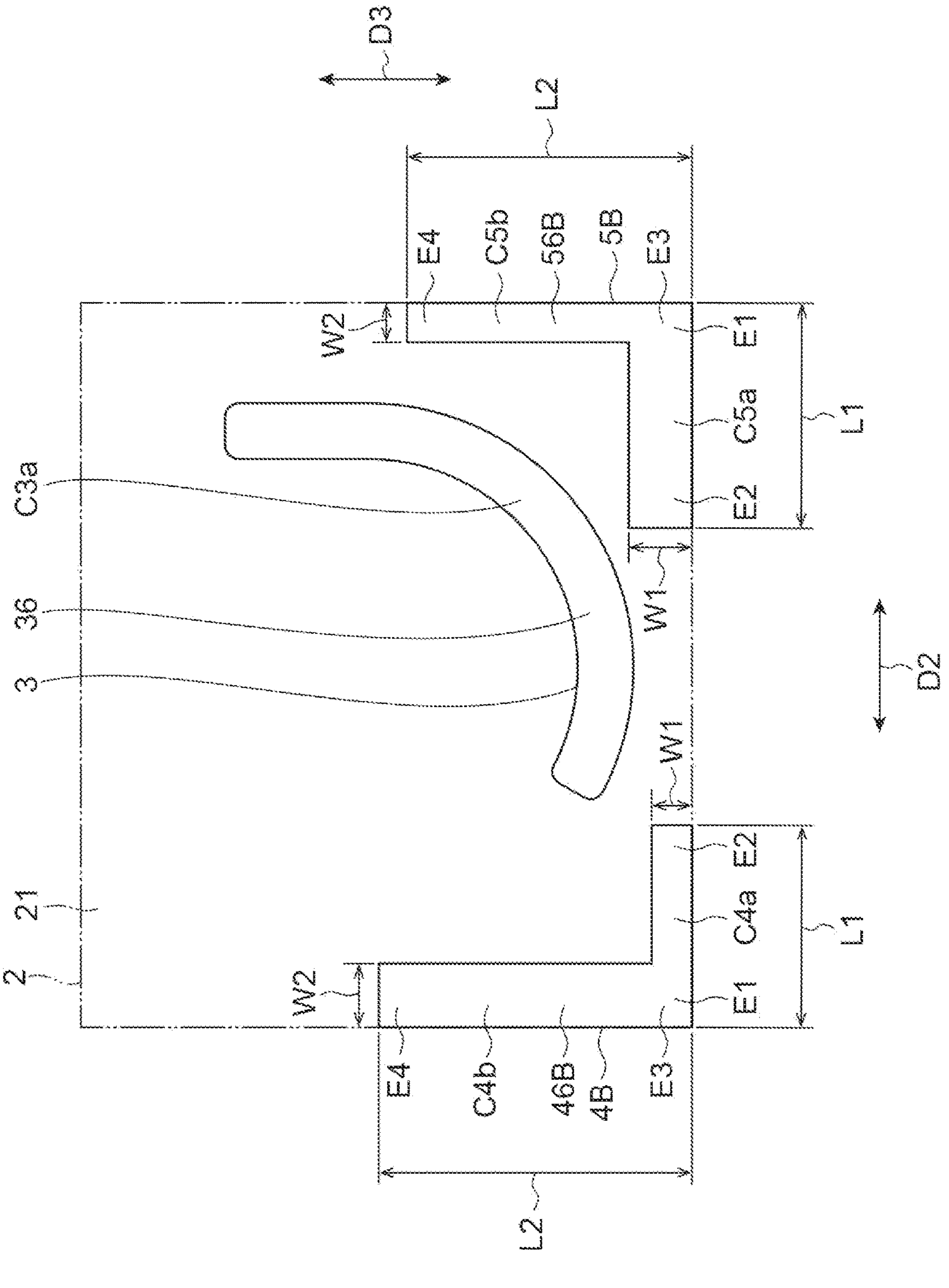
FIG. 19 is a view illustrating a constitution of other electrode conductors.
Figure 20:
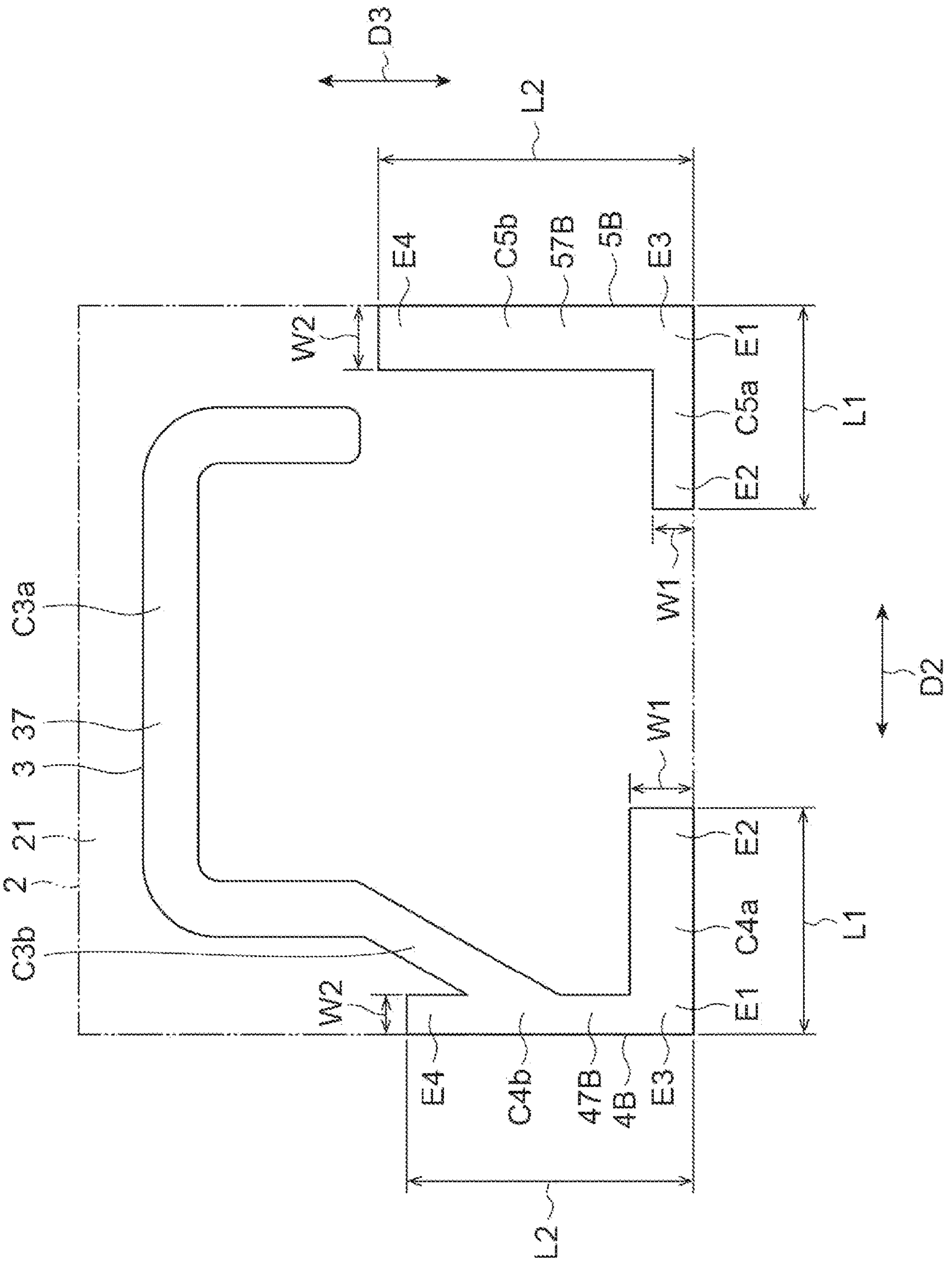
FIG. 20 is a view illustrating a constitution of other electrode conductors.

A multilayer coil component 1B according to a third embodiment will be described with reference to FIGS. 16 to 20. FIG. 16 is an exploded view illustrating a constitution of the multilayer coil component 1B. FIG. 17 is a view illustrating a constitution of electrode conductors 41B and 51B. FIG. 18 is a view illustrating a constitution of electrode conductors 42B and 52B. FIG. 19 is a view illustrating a constitution of electrode conductors 46B and 56B. FIG. 20 is a view illustrating a constitution of electrode conductors 47B and 57B. The third embodiment differs from the first embodiment described above in constitution of the electrode conductors of the external electrode. Hereinafter, differences between the first embodiment described above and the third embodiment will be mainly described. The multilayer coil component 1B includes the element body 2, the coil 3, and a pair of external electrodes 4B and 5B.

The external electrode 4B includes a plurality of electrode conductors 41B to 47B. The electrode conductor 41B, the electrode conductor 42B, the electrode conductor 43B, the electrode conductor 44B, the electrode conductor 45B, the electrode conductor 46B, and the electrode conductor 47B are stacked in a direction toward the side surface 2*c* from the side surface 2*b* in this order. The plurality of electrode conductors 41B to 47B are arranged in the first direction D1, that is, the coil axis direction of the coil 3. The electrode conductor 41B and the electrode conductor 42B are adjacent to each other in the first direction D1. For example, when the electrode conductor 41B constitutes a first electrode conductor, the electrode conductor 42B constitutes a second electrode conductor. The electrode conductor 46B and the electrode conductor 47B are adjacent to each other in the first direction D1. For example, when the electrode conductor 46B constitutes a sixth electrode conductor, the electrode conductor 47B constitutes a fifth electrode conductor.

The electrode conductor 41B and the electrode conductor 47B are outermost electrode conductors positioned on the outermost sides in the first direction D1 of the plurality of electrode conductors 41B to 47B. The electrode conductor 41B and the electrode conductor 47B are positioned at the ends of the external electrode 4B in the first direction D1. The electrode conductor 41B is closest to the side surface 2*b* of the plurality of electrode conductors 41B to 47B. The electrode conductor 47B is closest to the side surface 2*c* of the plurality of electrode conductors 41B to 47B. The electrode conductor 41B is positioned in the same layer as the coil conductor 31. The electrode conductor 47B is positioned in the same layer as the coil conductor 37. The conductor part C4*b* of the electrode conductor 47B is connected to the conductor part C3*b* of the coil conductor 37. In the present embodiment, the conductor part C4*b* of the electrode conductor 47B is continuous with the conductor part C3*b* of the coil conductor 37. The plurality of electrode conductors 42B to 46B are positioned between the electrode conductor 41B and the electrode conductor 47B in the first direction D1. The plurality of electrode conductors 42B to 46B are positioned in the same layer as the plurality of coil conductors 32 to 36. Each of the plurality of electrode conductors 41B to 47B includes the conductor part C4*a* and the conductor part C4*b*.

The external electrode 5B includes a plurality of electrode conductors 51B to 57B. The electrode conductor 51B, the electrode conductor 52B, the electrode conductor 53B, the electrode conductor 54B, the electrode conductor 55B, the electrode conductor 56B, and the electrode conductor 57B are stacked in a direction toward the side surface 2*c* from the side surface 2*b* in this order. The plurality of electrode conductors 51B to 57B are arranged in the first direction D1, that is, the coil axis direction of the coil 3. The electrode conductor 51B and the electrode conductor 52B are adjacent to each other in the first direction D1. The electrode conductor 51B is positioned in the same layer as the electrode conductor 41B, and the electrode conductor 52B is positioned in the same layer as the electrode conductor 42B. For example, when the electrode conductor 51B constitutes a third electrode conductor, the electrode conductor 52B constitutes a fourth electrode conductor. The electrode conductor 56B and the electrode conductor 57B are adjacent to each other in the first direction D1. The electrode conductor 56B is positioned in the same layer as the electrode conductor 46B, and the electrode conductor 57B is positioned in the same layer as the electrode conductor 47B. For example, when the electrode conductor 56B constitutes an eighth electrode conductor, the electrode conductor 57B constitutes a seventh electrode conductor.

The electrode conductor 51B and the electrode conductor 57B are outermost electrode conductors positioned on the outermost sides in the first direction D1 of the plurality of electrode conductors 51B to 57B. The electrode conductor 51B and the electrode conductor 57B are positioned at the ends of the external electrode 5B in the first direction D1. The electrode conductor 51B is closest to the side surface 2*b* of the plurality of electrode conductors 51B to 57B. The electrode conductor 57B is closest to the side surface 2*c* of the plurality of electrode conductors 51B to 57B. The electrode conductor 51B is positioned in the same layer as the coil conductor 31. The electrode conductor 57B is positioned in the same layer as the coil conductor 37. The conductor part C5*b* of the electrode conductor 51B is connected to the conductor part C3*b* of the coil conductor 31. In the present embodiment, the conductor part C5*b* of the electrode conductor 51B is continuous with the conductor part C3*b* of the coil conductor 31. The plurality of electrode conductors 52B to 56B are positioned between the electrode conductor 51B and the electrode conductor 57B in the first direction D1. The plurality of electrode conductors 52B to 56B are positioned in the same layer as the plurality of coil conductors 32 to 36. Each of the plurality of electrode conductors 51B to 57B includes the conductor part C5*a* and the conductor part C5*b*.

As illustrated in FIG. 17, the width W1 of the conductor part C4*a* of the electrode conductor 41B is smaller than the width W1 of the conductor part C5*a* of the electrode conductor 51B. The length L1 of the conductor part C4*a* of the electrode conductor 41B is smaller than the length L1 of the conductor part C5*a* of the electrode conductor 51B. The width W2 of the conductor part C4*b* of the electrode conductor 41B is larger than the width W2 of the conductor part C5*b* of the electrode conductor 51B. The length L2 of the conductor part C4*b* of the electrode conductor 41B is larger than the length L2 of the conductor part C5*b* of the electrode conductor 51B.

As illustrated in FIG. 18, the width W1 of the conductor part C4*a* of the electrode conductor 42B is larger than the width W1 of the conductor part C5*a* of the electrode conductor 52B. The length L1 of the conductor part C4*a* of the electrode conductor 42B is larger than the length L1 of the conductor part C5*a* of the electrode conductor 52B. The width W2 of the conductor part C4*b* of the electrode conductor 42B is smaller than the width W2 of the conductor part C5*b* of the electrode conductor 52B. The length L2 of the conductor part C4*b* of the electrode conductor 42B is smaller than the length L2 of the conductor part C5*b* of the electrode conductor 52B.

As illustrated in FIGS. 17 and 18, the width W1 of the conductor part C4*a* of the electrode conductor 41B is smaller than the width W1 of the conductor part C4*a* of the electrode conductor 42B. The length L1 of the conductor part C4*a* of the electrode conductor 41B is smaller than the length L1 of the conductor part C4*a* of the electrode conductor 42B. The width W2 of the conductor part C4*b* of the electrode conductor 41B is larger than the width W2 of the conductor part C4*b* of the electrode conductor 42B. The length L2 of the conductor part C4*b* of the electrode conductor 41B is larger than the length L2 of the conductor part C4*b* of the electrode conductor 42B.

As illustrated in FIGS. 17 and 18, the width W1 of the conductor part C5*a* of the electrode conductor 51B is larger than the width W1 of the conductor part C5*a* of the electrode conductor 52B. The length L1 of the conductor part C5*a* of the electrode conductor 51B is larger than the length L1 of the conductor part C5*a* of the electrode conductor 52B. The width W2 of the conductor part C5*b* of the electrode conductor 51B is smaller than the width W2 of the conductor part C5*b* of the electrode conductor 52B. The length L2 of the conductor part C5*b* of the electrode conductor 51B is smaller than the length L2 of the conductor part C5*b* of the electrode conductor 52B.

As illustrated in FIG. 19, the width W1 of the conductor part C4*a* of the electrode conductor 46B is smaller than the width W1 of the conductor part C5*a* of the electrode conductor 56B. The length L1 of the conductor part C4*a* of the electrode conductor 46B is smaller than the length L1 of the conductor part C5*a* of the electrode conductor 56B. The width W2 of the conductor part C4*b* of the electrode conductor 46B is larger than the width W2 of the conductor part C5*b* of the electrode conductor 56B. The length L2 of the conductor part C4*b* of the electrode conductor 46B is larger than the length L2 of the conductor part C5*b* of the electrode conductor 56B.

As illustrated in FIG. 20, the width W1 of the conductor part C4*a* of the electrode conductor 47B is larger than the width W1 of the conductor part C5*a* of the electrode conductor 57B. The length L1 of the conductor part C4*a* of the electrode conductor 47B is larger than the length L1 of the conductor part C5*a* of the electrode conductor 57B. The width W2 of the conductor part C4*b* of the electrode conductor 47B is smaller than the width W2 of the conductor part C5*b* of the electrode conductor 57B. The length L2 of the conductor part C4*b* of the electrode conductor 47B is smaller than the length L2 of the conductor part C5*b* of the electrode conductor 57B.

As illustrated in FIGS. 19 and 20, the width W1 of the conductor part C4*a* of the electrode conductor 47B is larger than the width W1 of the conductor part C4*a* of the electrode conductor 46B. The length L1 of the conductor part C4*a* of the electrode conductor 47B is larger than the length L1 of the conductor part C4*a* of the electrode conductor 46B. The width W2 of the conductor part C4*b* of the electrode conductor 47B is smaller than the width W2 of the conductor part C4*b* of the electrode conductor 46B. The length L2 of the conductor part C4*b* of the electrode conductor 47B is smaller than the length L2 of the conductor part C4*b* of the electrode conductor 46B.

As illustrated in FIGS. 19 and 20, the width W1 of the conductor part C5*a* of the electrode conductor 57B is smaller than the width W1 of the conductor part C5*a* of the electrode conductor 56B. The length L1 of the conductor part C5*a* of the electrode conductor 57B is smaller than the length L1 of the conductor part C5*a* of the electrode conductor 56B. The width W2 of the conductor part C5*b* of the electrode conductor 57B is larger than the width W2 of the conductor part C5*b* of the electrode conductor 56B. The length L2 of the conductor part C5*b* of the electrode conductor 57B is larger than the length L2 of the conductor part C5*b* of the electrode conductor 56B.

The electrode conductors 43B and 46B have shapes similar to shape of the electrode conductor 41B, and the electrode conductors 45B and 47B have shapes similar to shape of the electrode conductor 42B. The electrode conductors 53B and 56B have shapes similar to shape of the electrode conductor 51B, and the electrode conductors 55B and 57B have shapes similar to shape of the electrode conductor 52B.

A volume of the element body 2 is smaller in a layer in which the coil conductor 31 is positioned and a layer in which the coil conductor 37 is positioned than those in other layers by an amount corresponding to the conductor part C3*b*. However, in a constitution of the third embodiment in which the length L2 of the conductor part C5*b* of the electrode conductor 51B is smaller than the length L2 of the conductor part C5*b* of the electrode conductor 52B and the length L2 of the conductor part C4*b* of the electrode conductor 47B is smaller than the length L2 of the conductor part C4*b* of the electrode conductor 46B, the volumes of the electrode conductor 51B and the electrode conductor 47B are reduced. Therefore, the volume of the element body 2 increases in the layer in which the coil conductor 31 is positioned and the layer in which the coil conductor 37 is positioned. As a result of increase in volume of the element body 2, the strength of the multilayer coil component 1B is improved. Since the volumes of the external electrodes 4B and 5B are smaller than the volume of the element body 2, cracking tends not to occur in the element body 2.

Fourth Embodiment

Figure 21:
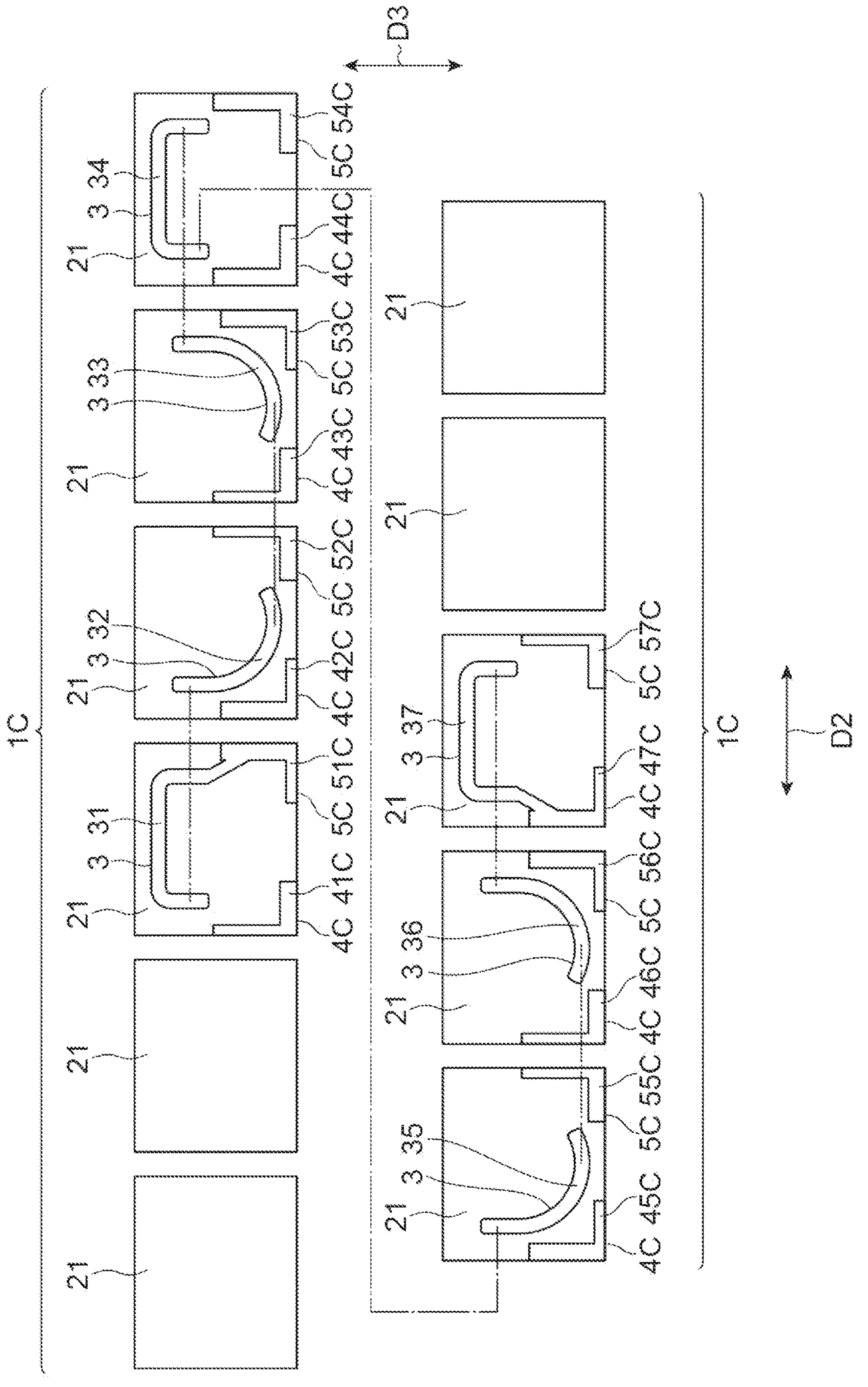
FIG. 21 is an exploded view illustrating a constitution of a multilayer coil component according to a fourth embodiment.
Figure 22:
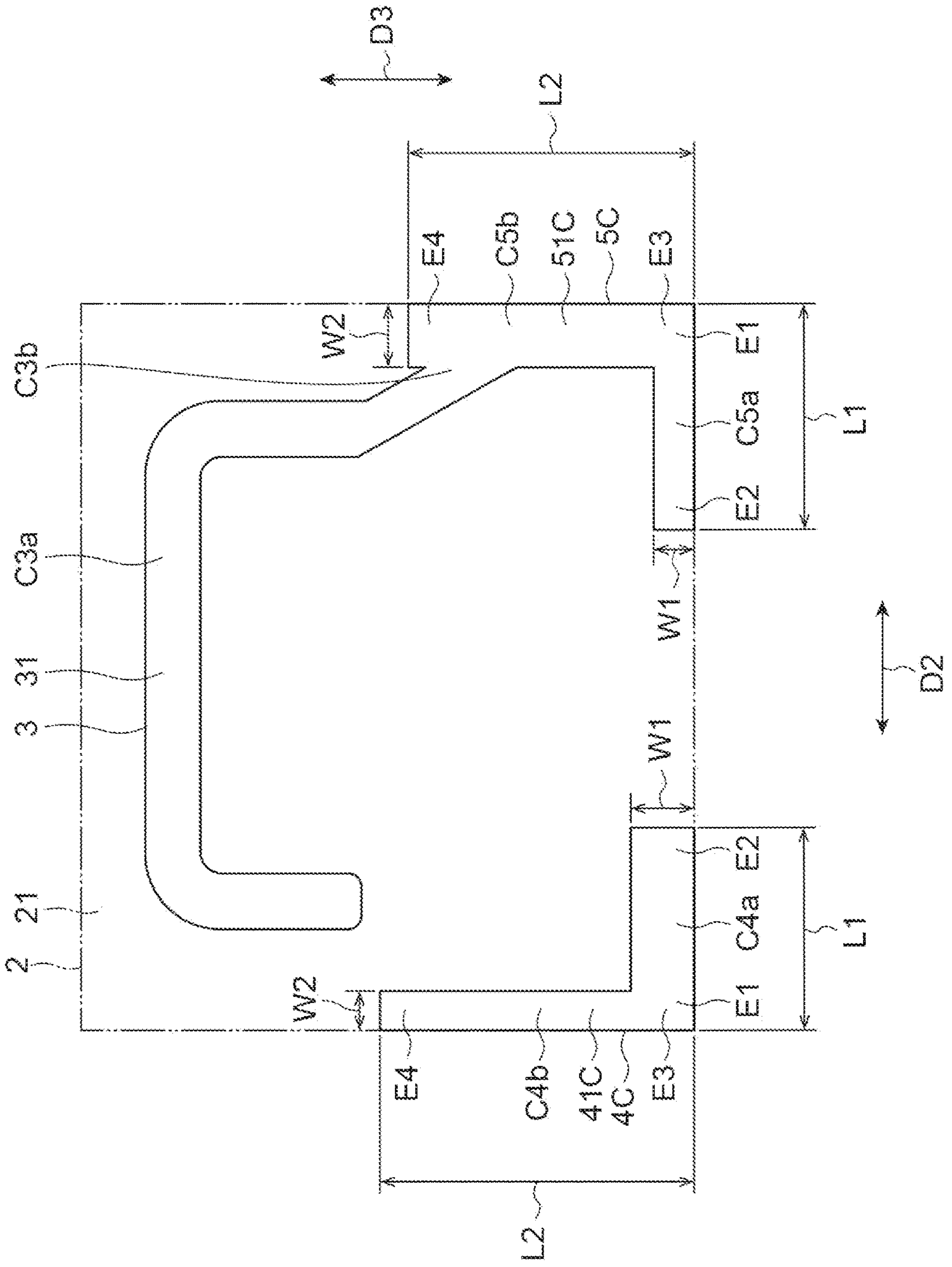
FIG. 22 is a view illustrating a constitution of electrode conductors.
Figure 23:
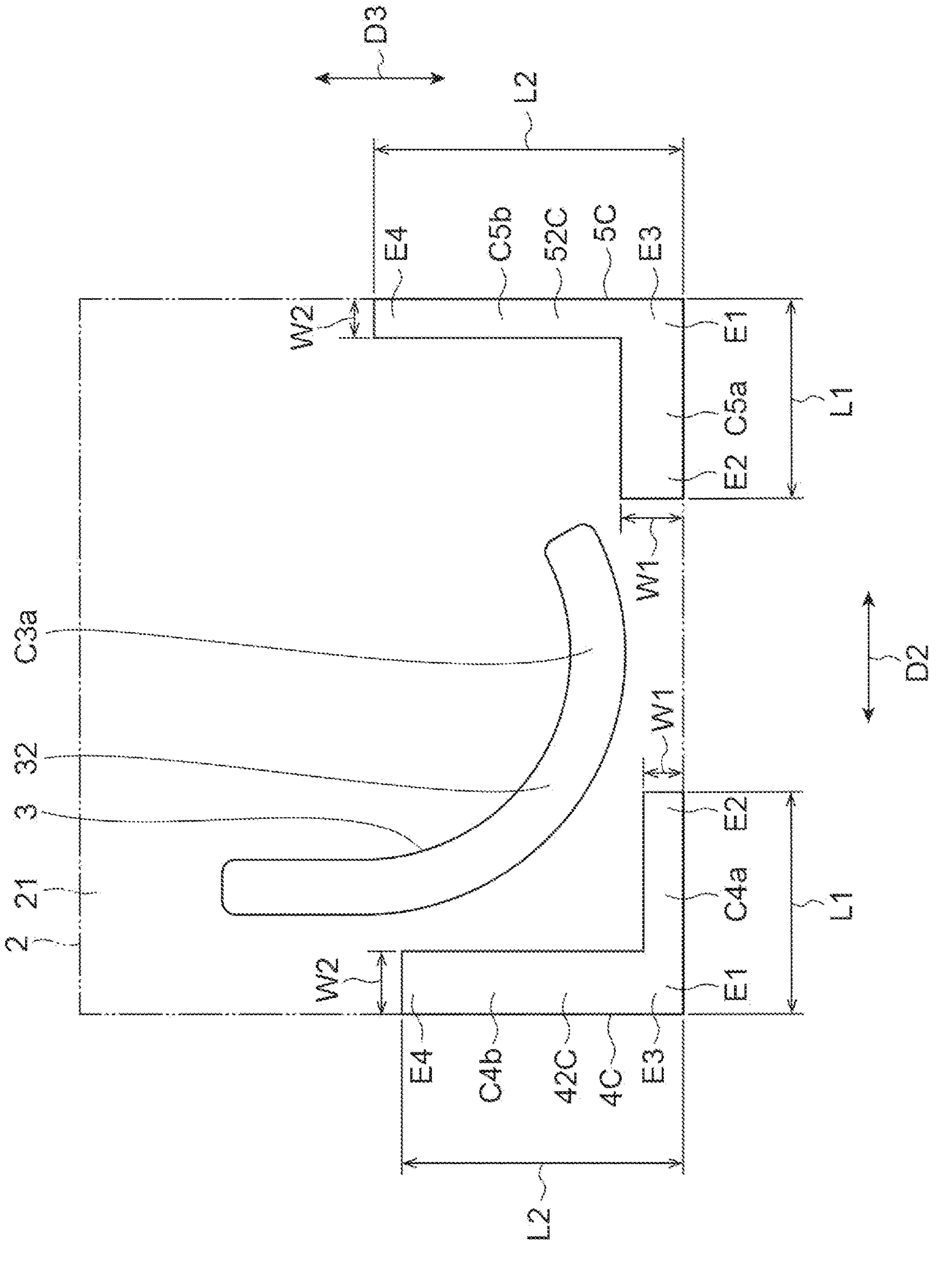
FIG. 23 is a view illustrating a constitution of other electrode conductors.

A multilayer coil component 1C according to a fourth embodiment will be described with reference to FIGS. 21 to 23. FIG. 21 is an exploded view illustrating a constitution of the multilayer coil component 1C. FIG. 22 is a view illustrating a constitution of electrode conductors 41C and 51C. FIG. 23 is a view illustrating a constitution of electrode conductors 42C and 52C. The fourth embodiment differs from the first embodiment described above in constitution of the electrode conductors of the external electrode. Hereinafter, differences between the first embodiment described above and the fourth embodiment will be mainly described. The multilayer coil component 1C includes the element body 2, the coil 3, and a pair of external electrodes 4C and 5C.

The external electrode 4C includes a plurality of electrode conductors 41C to 47C. The electrode conductor 41C, the electrode conductor 42C, the electrode conductor 43C, the electrode conductor 44C, the electrode conductor 45C, the electrode conductor 46C, and the electrode conductor 47C are stacked in a direction toward the side surface 2*c* from the side surface 2*b* in this order. The plurality of electrode conductors 41C to 47C are arranged in the first direction D1, that is, the coil axis direction of the coil 3. The electrode conductor 41C and the electrode conductor 42C are adjacent to each other in the first direction D1. For example, when the electrode conductor 41C constitutes a first electrode conductor, the electrode conductor 42C constitutes a second electrode conductor. The electrode conductor 46C and the electrode conductor 47C are adjacent to each other in the first direction D1. For example, when the electrode conductor 46C constitutes a sixth electrode conductor, the electrode conductor 47C constitutes a fifth electrode conductor.

The electrode conductor 41C and the electrode conductor 47C are outermost electrode conductors positioned on the outermost sides in the first direction D1 of the plurality of electrode conductors 41C to 47C. The electrode conductor 41C and the electrode conductor 47C are positioned at the ends of the external electrode 4C in the first direction D1. The electrode conductor 41C is closest to the side surface 2*b* of the plurality of electrode conductors 41C to 47C. The electrode conductor 47C is closest to the side surface 2*c* of the plurality of electrode conductors 41C to 47C. The electrode conductor 41C is positioned in the same layer as the coil conductor 31. The electrode conductor 47C is positioned in the same layer as the coil conductor 37. The plurality of electrode conductors 42C to 46C are positioned between the electrode conductor 41C and the electrode conductor 47C in the first direction D1. The plurality of electrode conductors 42C to 46C are positioned in the same layer as the plurality of coil conductors 32 to 36. Each of the plurality of electrode conductors 41C to 47C includes the conductor part C4*a* and the conductor part C4*b*.

The external electrode 5C includes a plurality of electrode conductors 51C to 57C. The electrode conductor 51C, the electrode conductor 52C, the electrode conductor 53C, the electrode conductor 54C, the electrode conductor 55C, the electrode conductor 56C, and the electrode conductor 57C are stacked in a direction toward the side surface 2*c* from the side surface 2*b* in this order. The plurality of electrode conductors 51C to 57C are arranged in the first direction D1, that is, the coil axis direction of the coil 3. The electrode conductor 51C and the electrode conductor 52C are adjacent to each other in the first direction D1. The electrode conductor 51C is positioned in the same layer as the electrode conductor 41C, and the electrode conductor 52C is positioned in the same layer as the electrode conductor 42C. For example, when the electrode conductor 51C constitutes a third electrode conductor, the electrode conductor 52C constitutes a fourth electrode conductor. The electrode conductor 56C and the electrode conductor 57C are adjacent to each other in the first direction D1. The electrode conductor 56C is positioned in the same layer as the electrode conductor 46C, and the electrode conductor 57C is positioned in the same layer as the electrode conductor 47C. For example, when the electrode conductor 56C constitutes an eighth electrode conductor, the electrode conductor 57C constitutes a seventh electrode conductor.

The electrode conductor 51C and the electrode conductor 57C are outermost electrode conductors positioned on the outermost sides in the first direction D1 of the plurality of electrode conductors 51C to 57C. The electrode conductor 51C and the electrode conductor 57C are positioned at the ends of the external electrode 5C in the first direction D1. The electrode conductor 51C is closest to the side surface 2*b* of the plurality of electrode conductors 51C to 57C. The electrode conductor 57C is closest to the side surface 2*c* of the plurality of electrode conductors 51C to 57C. The electrode conductor 51C is positioned in the same layer as the coil conductor 31. The electrode conductor 57C is positioned in the same layer as the coil conductor 37. The plurality of electrode conductors 52C to 56C are positioned between the electrode conductor 51C and the electrode conductor 57C in the first direction D1. The plurality of electrode conductors 52C to 56C are positioned in the same layer as the plurality of coil conductors 32 to 36. Each of the plurality of electrode conductors 51C to 57C includes the conductor part C5*a* and the conductor part C5*b*.

As illustrated in FIG. 22, the width W1 of the conductor part C4*a* of the electrode conductor 41C is larger than the width W1 of the conductor part C5*a* of the electrode conductor 51C. The length L1 of the conductor part C4*a* of the electrode conductor 41C is smaller than the length L1 of the conductor part C5*a* of the electrode conductor 51C. The width W2 of the conductor part C4*b* of the electrode conductor 41C is smaller than the width W2 of the conductor part C5*b* of the electrode conductor 51C. The length L2 of the conductor part C4*b* of the electrode conductor 41C is larger than the length L2 of the conductor part C5*b* of the electrode conductor 51C.

As illustrated in FIG. 23, the width W1 of the conductor part C4*a* of the electrode conductor 42C is smaller than the width W1 of the conductor part C5*a* of the electrode conductor 52C. The length L1 of the conductor part C4*a* of the electrode conductor 42C is larger than the length L1 of the conductor part C5*a* of the electrode conductor 52C. The width W2 of the conductor part C4*b* of the electrode conductor 42C is larger than the width W2 of the conductor part C5*b* of the electrode conductor 52C. The length L2 of the conductor part C4*b* of the electrode conductor 42C is smaller than the length L2 of the conductor part C5*b* of the electrode conductor 52C.

As illustrated in FIGS. 22 and 23, the width W1 of the conductor part C4*a* of the electrode conductor 41C is larger than the width W1 of the conductor part C4*a* of the electrode conductor 42C. The length L1 of the conductor part C4*a* of the electrode conductor 41C is smaller than the length L1 of the conductor part C4*a* of the electrode conductor 42C. The width W2 of the conductor part C4*b* of the electrode conductor 41C is smaller than the width W2 of the conductor part C4*b* of the electrode conductor 42C. The length L2 of the conductor part C4*b* of the electrode conductor 41C is larger than the length L2 of the conductor part C4*b* of the electrode conductor 42C.

As illustrated in FIGS. 22 and 23, the width W1 of the conductor part C5*a* of the electrode conductor 51C is smaller than the width W1 of the conductor part C5*a* of the electrode conductor 52C. The length L1 of the conductor part C5*a* of the electrode conductor 51C is larger than the length L1 of the conductor part C5*a* of the electrode conductor 52C. The width W2 of the conductor part C5*b* of the electrode conductor 51C is larger than the width W2 of the conductor part C5*b* of the electrode conductor 52C. The length L2 of the conductor part C5*b* of the electrode conductor 51C is smaller than the length L2 of the conductor part C5*b* of the electrode conductor 52C.

The electrode conductors 43C and 46C have shapes similar to shape of the electrode conductor 41C, and the electrode conductors 45C and 47C have shapes similar to shape of the electrode conductor 42C.

The electrode conductors 53C and 56C have shapes similar to shape of the electrode conductor 51C, and the electrode conductors 55C and 57C have shapes similar to shape of the electrode conductor 52C.

The width W1 of the conductor part C4*a* of the electrode conductor 41C is larger than the width W1 of the conductor part C4*a* of the electrode conductor 42C. The length L1 of the conductor part C4*a* of the electrode conductor 41C is smaller than the length L1 of the conductor part C4*a* of the electrode conductor 42C. The width W2 of the conductor part C4*b* of the electrode conductor 41C is smaller than the width W2 of the conductor part C4*b* of the electrode conductor 42C. The length L2 of the conductor part C4*b* of the electrode conductor 41C is larger than the length L2 of the conductor part C4*b* of the electrode conductor 42C. Therefore, a surface of the external electrode 4C opposing the element body 2 has a more complicated shape, and the area of the external electrode 4C in contact with the element body 2 further increases. As a result, the fixing strength of the external electrode 4C with respect to the element body 2 is further improved.

The width W1 of the conductor part C4*a* of the electrode conductor 41C is larger than the width W1 of the conductor part C5*a* of the electrode conductor 51C. The length L1 of the conductor part C4*a* of the electrode conductor 41C is smaller than the length L1 of the conductor part C5*a* of the electrode conductor 51C. The width W2 of the conductor part C4*b* of the electrode conductor 41C is smaller than the width W2 of the conductor part C5*b* of the electrode conductor 51C. The length L2 of the conductor part C4*b* of the electrode conductor 41C is larger than the length L2 of the conductor part C5*b* of the electrode conductor 51C. Therefore, the surfaces of the external electrode 4C and the external electrode 5C opposing the element body 2 have a more complicated shape, and the area of the external electrode 4C in contact with the element body 2 and the area of the external electrode 5C in contact with the element body 2 further increase. As a result, the fixing strengths of the external electrode 4C and the external electrode 5C with respect to the element body 2 are further improved.

Fifth Embodiment

Figure 24:
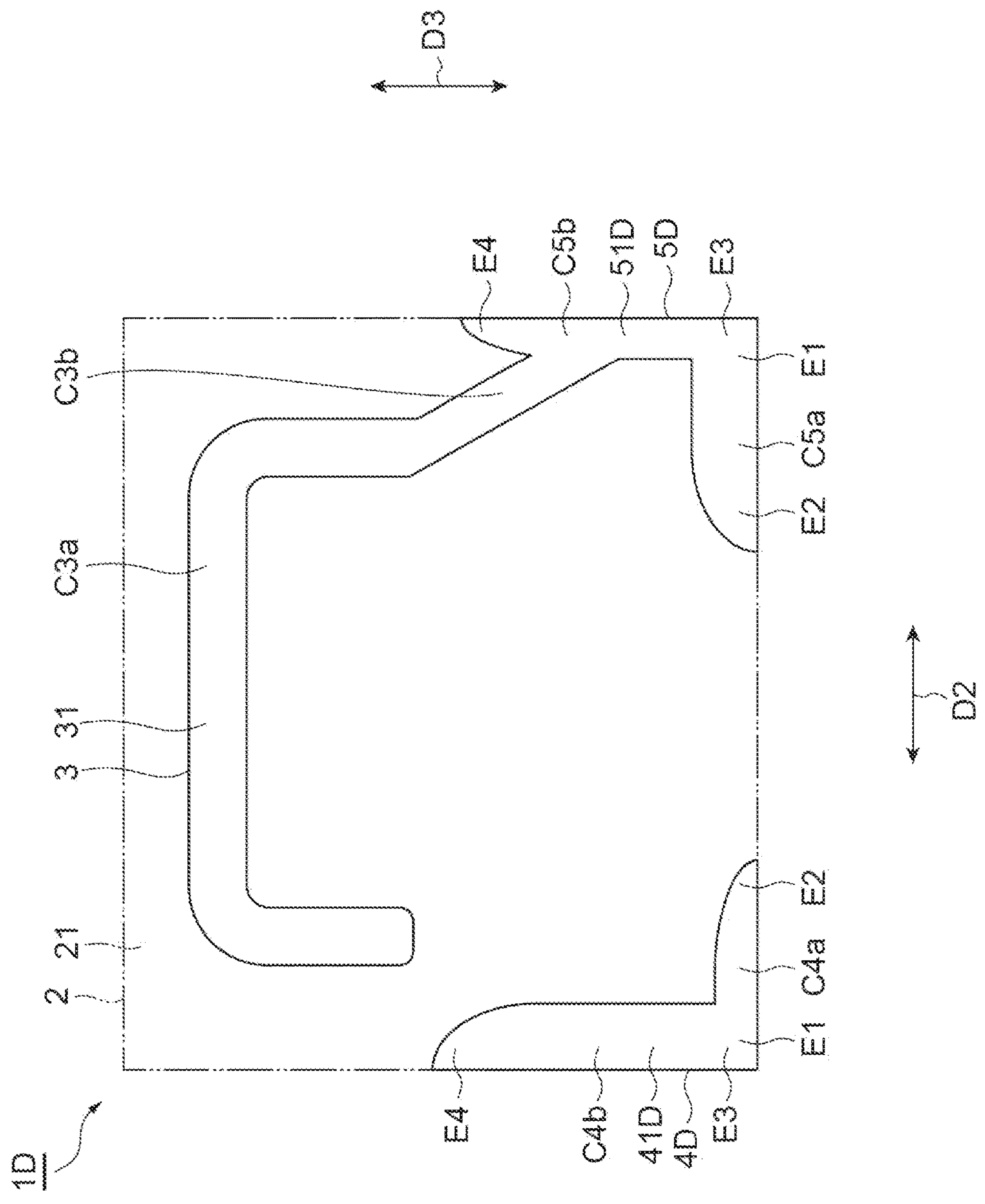
FIG. 24 is a view illustrating a constitution of other electrode conductors.

A multilayer coil component 1D according to a fifth embodiment will be described with reference to FIG. 24. FIG. 24 is a view illustrating a constitution of electrode conductors 41D and 51D. The fifth embodiment differs from the first embodiment described above in constitution of the electrode conductors of the external electrode. Hereinafter, differences between the first embodiment described above and the fifth embodiment will be mainly described. The multilayer coil component 1D includes the element body 2, the coil 3, and a pair of external electrodes 4D and 5D.

The external electrode 4D includes a plurality of electrode conductors including the electrode conductor 41D. A surface of the second end E2 of the conductor part C4*a* included in the electrode conductor 41D is curved when viewed in the first direction D1. A surface of the second end E4 of the conductor part C4*b* included in the electrode conductor 41D is curved when viewed in the first direction D1. The surfaces of the second ends E2 and E4 have a curved shape projecting toward the inward side of the element body 2 when viewed in the first direction D1. Even in other electrode conductors included in the external electrode 4D, the surfaces of the second ends E2 and E4 are curved when viewed in the first direction D1.

The external electrode 5D includes a plurality of electrode conductors including the electrode conductor 51D. A surface of the second end E2 of the conductor part C5*a* included in the electrode conductor 51D is curved when viewed in the first direction D1. The surface of the second end E4 of the conductor part C5*b* included in the electrode conductor 51D is curved when viewed in the first direction D1. The surfaces of the second ends E2 and E4 have a curved shape projecting toward the inward side of the element body 2 when viewed in the first direction D1. Even in other electrode conductors included in the external electrode 5D, the surfaces of the second ends E2 and E4 are curved when viewed in the first direction D1.

In each of the plurality of electrode conductors included in the external electrodes 4D and 5D, the first end E1 and the first end E3 are continuous with each other. In each of the plurality of electrode conductors included in the external electrodes 4D and 5D, the surface of the second end E2 and the surface of the second end E4 are curved when viewed in the first direction D1. Compared to a constitution in which the surface of the second end E2 and the surface of the second end E4 are not curved and include corner portions projecting to the inward side of the element body 2, in the constitution of the present embodiment, the volume of each of the electrode conductors may be reduced. When the volume of each of the electrode conductors is reduced, the volume of the element body 2 relatively increases, and the strength of the multilayer coil component 1D is improved. When the volume of each of the electrode conductors is reduced, a stray capacitance generated between each of the electrode conductors and the coil 3 is reduced.

Sixth Embodiment

Figure 25:
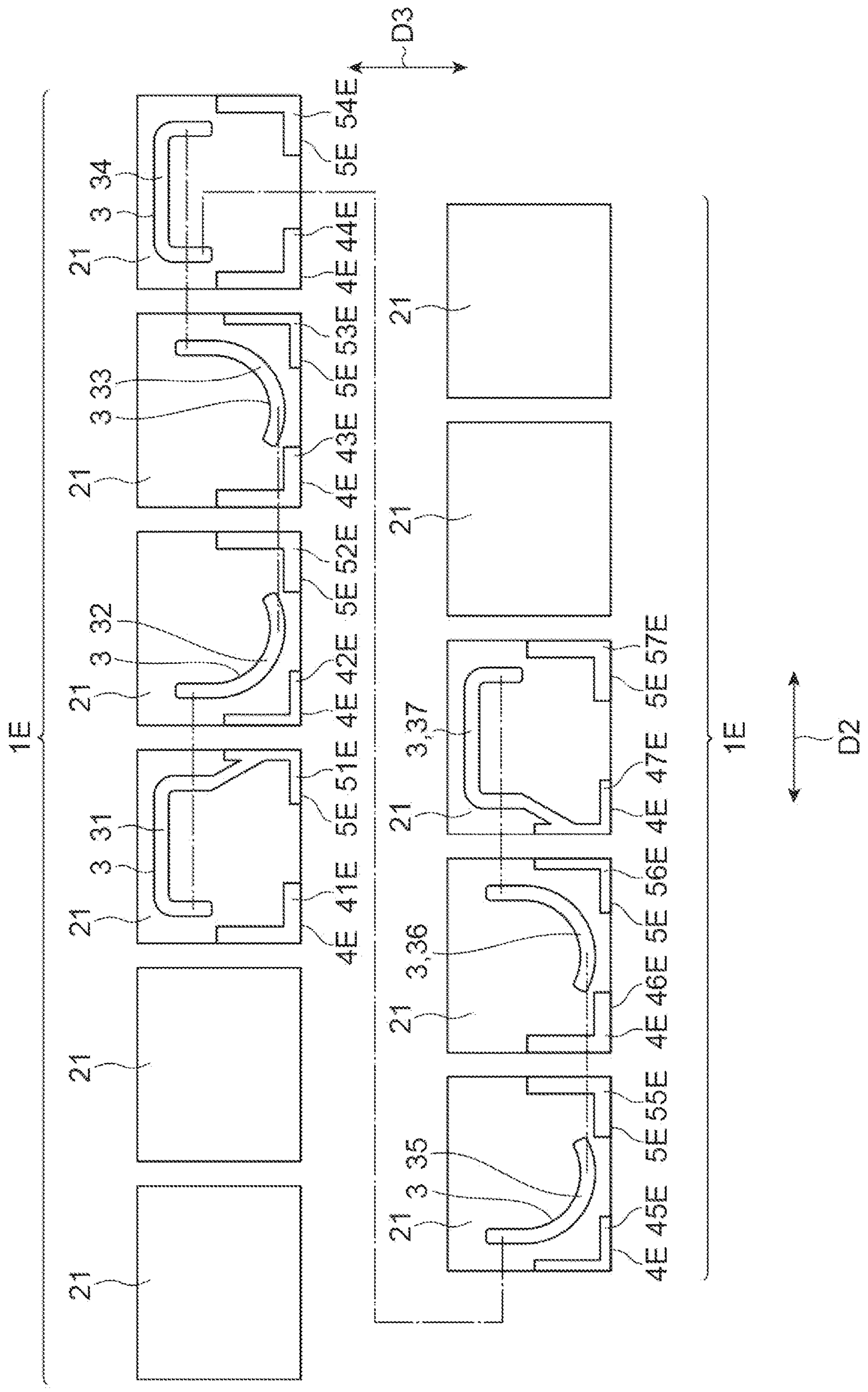
FIG. 25 is an exploded view illustrating a constitution of a multilayer coil component according to a sixth embodiment.
Figure 26:
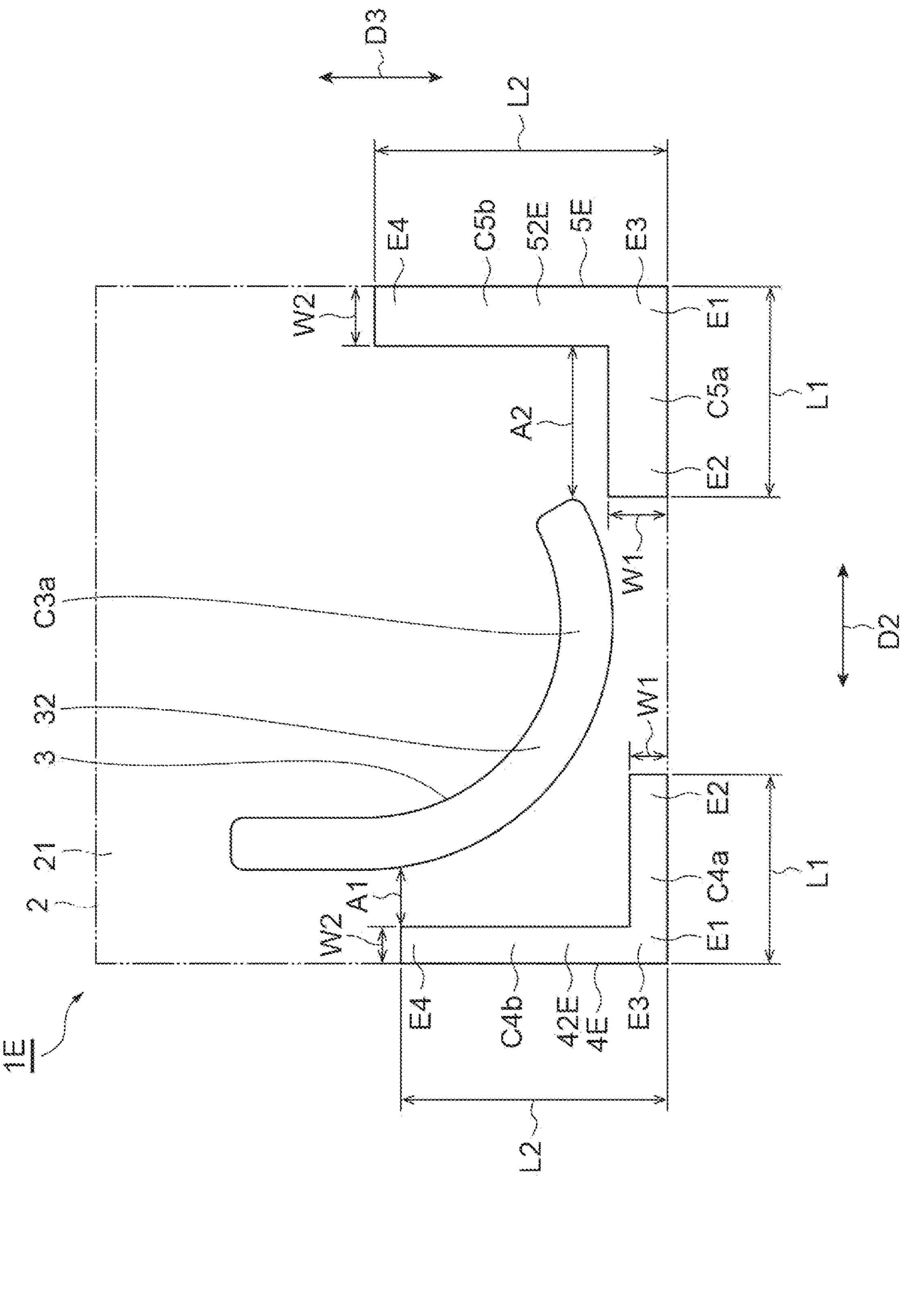
FIG. 26 is a view illustrating a constitution of electrode conductors.
Figure 27:
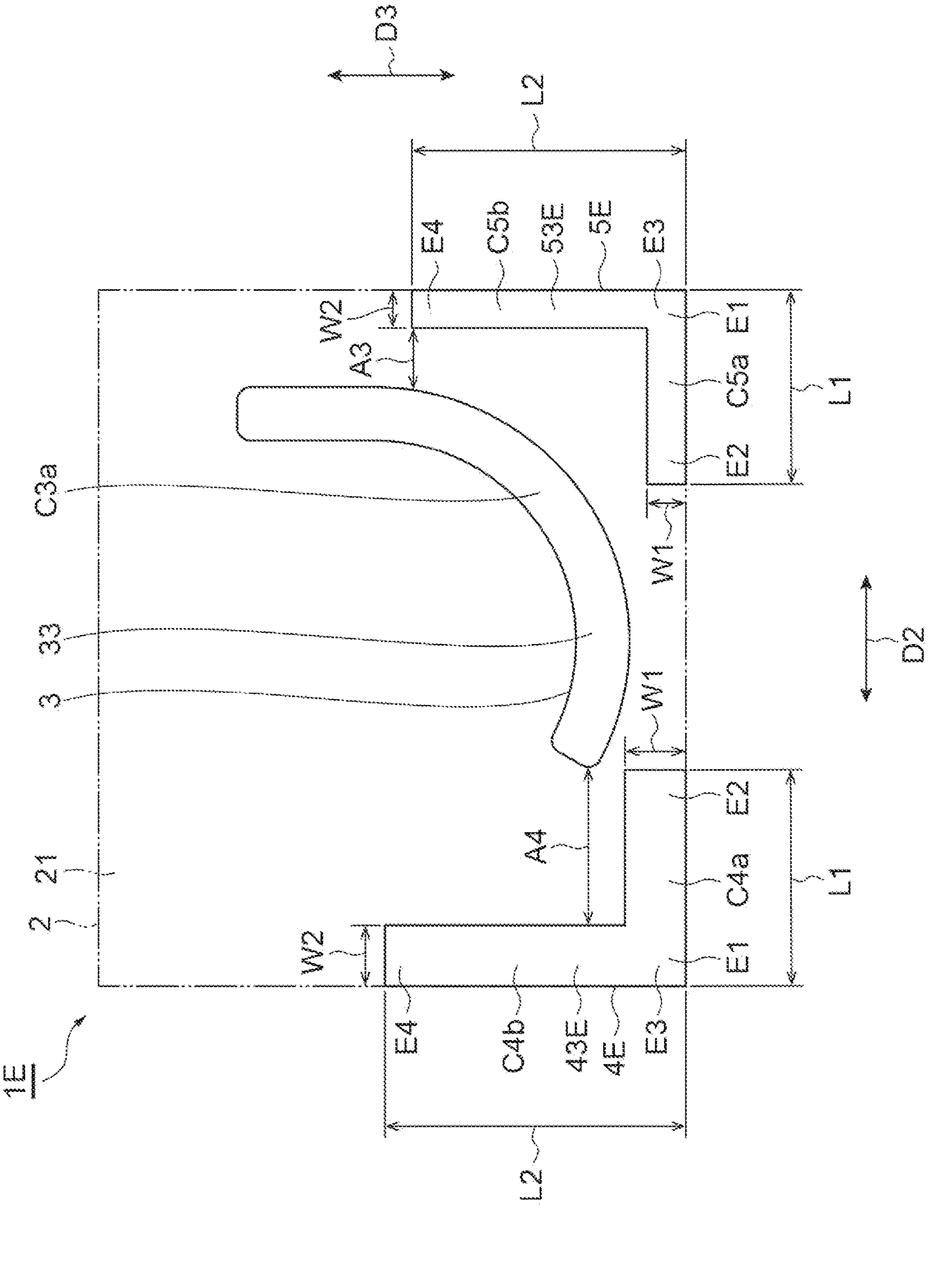
FIG. 27 is a view illustrating a constitution of other electrode conductors.

A multilayer coil component 1E according to a sixth embodiment will be described with reference to FIGS. 25 to 27. FIG. 25 is an exploded view illustrating a constitution of the multilayer coil component 1E. FIG. 26 is a view illustrating a constitution of electrode conductors 42E and 52E. FIG. 27 is a view illustrating a constitution of electrode conductors 43E and 53E. The sixth embodiment differs from the first embodiment described above in constitution of the electrode conductors of the external electrode. Hereinafter, differences between the first embodiment described above and the sixth embodiment will be mainly described. The multilayer coil component 1E includes the element body 2, the coil 3, and a pair of external electrodes 4E and 5E.

The external electrode 4E includes a plurality of electrode conductors 41E to 47E. The electrode conductor 41E, the electrode conductor 42E, the electrode conductor 43E, the electrode conductor 44E, the electrode conductor 45E, the electrode conductor 46E, and the electrode conductor 47E are stacked in a direction toward the side surface 2*c* from the side surface 2*b* in this order. The plurality of electrode conductors 41E to 47E are arranged in the first direction D1, that is, the coil axis direction of the coil 3. Each of the plurality of electrode conductors 41E to 47E includes the conductor part C4*a* and the conductor part C4*b*.

The external electrode 5E includes a plurality of electrode conductors 51E to 57E. The electrode conductor 51E, the electrode conductor 52E, the electrode conductor 53E, the electrode conductor 54E, the electrode conductor 55E, the electrode conductor 56E, and the electrode conductor 57E are stacked in a direction toward the side surface 2*c* from the side surface 2*b* in this order. The plurality of electrode conductors 51E to 57E are arranged in the first direction D1, that is, the coil axis direction of the coil 3. Each of the plurality of electrode conductors 51E to 57E includes the conductor part C5*a* and the conductor part C5*b*.

The electrode conductor 42E and the electrode conductor 52E are positioned in the same layer as the coil conductor 32. For example, when the electrode conductor 42E constitutes a first electrode conductor, the electrode conductor 52E constitutes a third electrode conductor, and the coil conductor 32 constitutes a first coil conductor. The electrode conductor 43E is adjacent to the electrode conductor 42E, and the electrode conductor 53E is adjacent to the electrode conductor 52E. The electrode conductor 43E and the electrode conductor 53E are positioned in the same layer as the coil conductor 33. For example, when the electrode conductor 43E constitutes a second electrode conductor, the electrode conductor 53E constitutes a fourth electrode conductor, and the coil conductor 33 constitutes a third coil conductor.

As illustrated in FIG. 26, a shortest separation distance A1 between the conductor part C4*b* of the electrode conductor 42E and the coil conductor 32 is smaller than a shortest separation distance A2 between the conductor part C5*b* of the electrode conductor 52E and the coil conductor 32. As illustrated in FIG. 27, a shortest separation distance A3 between the conductor part C5*b* of the electrode conductor 53E and the coil conductor 33 is smaller than a shortest separation distance A4 between the conductor part C4*b* of the electrode conductor 43E and the coil conductor 33.

As illustrated in FIG. 26, the width W1 of the conductor part C4*a* of the electrode conductor 42E is smaller than the width W1 of the conductor part C5*a* of the electrode conductor 52E. The length L1 of the conductor part C4*a* of the electrode conductor 42E is smaller than the length L1 of the conductor part C5*a* of the electrode conductor 52E. The width W2 of the conductor part C4*b* of the electrode conductor 42E is smaller than the width W2 of the conductor part C5*b* of the electrode conductor 52E. The length L2 of the conductor part C4*b* of the electrode conductor 42E is smaller than the length L2 of the conductor part C5*b* of the electrode conductor 52E.

As illustrated in FIG. 27, the width W1 of the conductor part C4*a* of the electrode conductor 43E is larger than the width W1 of the conductor part C5*a* of the electrode conductor 53E. The length L1 of the conductor part C4*a* of the electrode conductor 43E is larger than the length L1 of the conductor part C5*a* of the electrode conductor 53E. The width W2 of the conductor part C4*b* of the electrode conductor 43E is larger than the width W2 of the conductor part C5*b* of the electrode conductor 53E. The length L2 of the conductor part C4*b* of the electrode conductor 43E is larger than the length L2 of the conductor part C5*b* of the electrode conductor 53E.

As illustrated in FIGS. 26 and 27, the width W1 of the conductor part C4*a* of the electrode conductor 42E is smaller than the width W1 of the conductor part C4*a* of the electrode conductor 43E. The length L1 of the conductor part C4*a* of the electrode conductor 42E is smaller than the length L1 of the conductor part C4*a* of the electrode conductor 43E. The width W2 of the conductor part C4*b* of the electrode conductor 42E is smaller than the width W2 of the conductor part C4*b* of the electrode conductor 43E. The length L2 of the conductor part C4*b* of the electrode conductor 42E is smaller than the length L2 of the conductor part C4*b* of the electrode conductor 43E.

As illustrated in FIGS. 26 and 27, the width W1 of the conductor part C5*a* of the electrode conductor 52E is larger than the width W1 of the conductor part C5*a* of the electrode conductor 53E. The length L1 of the conductor part C5*a* of the electrode conductor 52E is larger than the length L1 of the conductor part C5*a* of the electrode conductor 53E. The width W2 of the conductor part C5*b* of the electrode conductor 52E is larger than the width W2 of the conductor part C5*b* of the electrode conductor 53E. The length L2 of the conductor part C5*b* of the electrode conductor 52E is larger than the length L2 of the conductor part C5*b* of the electrode conductor 53E.

The electrode conductors 45E and 47E have shapes similar to shape of the electrode conductor 42E, and the electrode conductors 41E, 44E, and 46E have shapes similar to shape of the electrode conductor 43E. The electrode conductors 54E, 55E, and 57E have shapes similar to shape of the electrode conductor 52E, and the electrode conductors 51E and 56E have shapes similar to shape of the electrode conductor 53E.

The coil 3 includes the plurality of coil conductors 31 to 37 arranged in the first direction D1 and connected to each other. The plurality of coil conductors 31 to 37 include the coil conductor 32 positioned at the same layer as the electrode conductor 42E and the electrode conductor 52E. The shortest separation distance A1 between the conductor part C4*b* of the electrode conductor 42E and the coil conductor 32 is smaller than the shortest separation distance A2 between the conductor part C5*b* of the electrode conductor 52E and the coil conductor 32. The width W2 of the conductor part C4*b* of the electrode conductor 42E is smaller than the width W2 of the conductor part C5*b* of the electrode conductor 52E. The length L2 of the conductor part C4*b* of the electrode conductor 42E is smaller than the length L2 of the conductor part C5*b* of the electrode conductor 52E. Therefore, the volume of the conductor part C4*b* of the electrode conductor 42E positioned closer to the coil conductor 32 than the conductor part C5*b* of the electrode conductor 52E is reduced, and increase in stray capacitance generated between the conductor part C4*b* of the electrode conductor 42E and the coil conductor 32 is curbed.

The plurality of coil conductors 31 to 37 include the coil conductor 33 positioned at the same layer as the electrode conductor 43E and the electrode conductor 53E. The shortest separation distance A1 between the conductor part C4*b* of the electrode conductor 42E and the coil conductor 32 is smaller than the shortest separation distance A4 between the conductor part C4*b* of the electrode conductor 43E and the coil conductor 33. The width W2 of the conductor part C4*b* of the electrode conductor 42E is smaller than the width W2 of the conductor part C4*b* of the electrode conductor 43E. The length L2 of the conductor part C4*b* of the electrode conductor 42E is smaller than the length L2 of the conductor part C4*b* of the electrode conductor 43E. Therefore, compared to the conductor part C4*b* of the electrode conductor 43E, the volume of the conductor part C4*b* of the electrode conductor 42E positioned close to the coil conductor in the same layer is reduced, and increase in stray capacitance generated between the conductor part C4*b* of the electrode conductor 42E and the coil conductor 32 is curbed.

Although the embodiments and modifications of the present invention have been described above, the present invention is not necessarily limited to the embodiments and modifications, and the embodiments can be variously changed without departing from the scope of the invention.

Any electrode conductor of the plurality of electrode conductors included in each of the external electrodes may constitute the first electrode conductor. The first embodiment has been described on the premise that the electrode conductor 41 constitutes the first electrode conductor, but any electrode conductor of the plurality of electrode conductors 41 to 47 and the plurality of electrode conductors 51 to 57 may constitute the first electrode conductor. An electrode conductor adjacent to the first electrode conductor constitutes the second electrode conductor, the electrode conductor positioned at the same layer as the first electrode conductor constitutes the third electrode conductor, and the electrode conductor positioned at the same layer as the second electrode conductor constitutes the fourth electrode conductor.

An electrode conductor constituting the first electrode conductor and an electrode conductor constituting the third electrode conductor need only differ from each other in at least any one dimension of the four dimensions. For example, in the first embodiment, the electrode conductor 41 and the electrode conductor 51 differ from each other in all of the four dimensions, but they need only differ from each other in at least any one dimension of the four dimensions. Similarly, an electrode conductor constituting the second electrode conductor and an electrode conductor constituting the fourth electrode conductor need only differ from each other in at least any one dimension of the four dimensions. An electrode conductor constituting the first electrode conductor and an electrode conductor constituting the second electrode conductor need only differ from each other in at least any one dimension of the four dimensions. An electrode conductor constituting the third electrode conductor and an electrode conductor constituting the fourth electrode conductor need only differ from each other in at least any one dimension of the four dimensions.

In all of the embodiments described above, the surface of the second end E2 of the conductor part C4*a* and the surface of the second end E4 of the conductor part C4*b* may be curved when viewed in the first direction D1. Similarly, the surface of the second end E2 of the conductor part C5*a* and the surface of the second end E4 of the conductor part C5*b* may be curved when viewed in the first direction D1.

What is claimed is:

1. A multilayer coil component comprising:

an element body including a main surface constituting a mounting surface, a first side surface and a second side surface opposing each other in a first direction, and a first end surface and a second end surface opposing each other in a second direction orthogonal to the first direction;

a coil disposed inside the element body; and a first external electrode and a second external electrode electrically connected to the coil and disposed on the element body, wherein each of the first external electrode and the second external electrode includes a plurality of electrode conductors arranged in the first direction and connected to each other, wherein each of the plurality of electrode conductors includes a first part extending in the second direction and a second part extending in a third direction orthogonal to the second direction when viewed in the first direction, wherein the plurality of electrode conductors included in the first external electrode include a first electrode conductor and a second electrode conductor adjacent to each other in the first direction, wherein the plurality of electrode conductors included in the second external electrode include a third electrode conductor positioned at the same layer as the first electrode conductor, and a fourth electrode conductor positioned at the same layer as the second electrode conductor, wherein the first electrode conductor and the third electrode conductor differ from each other in at least any one dimension of four dimensions including a width of the first part in the third direction, a length of the first part in the second direction, a width of the second part in the second direction, and a length of the second part in the third direction, wherein the second electrode conductor and the fourth electrode conductor differ from each other in at least any one dimension of the four dimensions, wherein the first electrode conductor and the second electrode conductor differ from each other in at least any one dimension of the four dimensions, and wherein the third electrode conductor and the fourth electrode conductor differ from each other in at least any one dimension of the four dimensions.

2. The multilayer coil component according to claim 1, wherein the width of the first part of the first electrode conductor is smaller than the width of the first part of the second electrode conductor, wherein the length of the first part of the first electrode conductor is smaller than the length of the first part of the second electrode conductor, wherein the width of the second part of the first electrode conductor is smaller than the width of the second part of the second electrode conductor, and wherein the length of the second part of the first electrode conductor is smaller than the length of the second part of the second electrode conductor.

3. The multilayer coil component according to claim 1, wherein the width of the first part of the first electrode conductor is smaller than the width of the first part of the third electrode conductor, wherein the length of the first part of the first electrode conductor is smaller than the length of the first part of the third electrode conductor, wherein the width of the second part of the first electrode conductor is smaller than the width of the second part of the third electrode conductor, and wherein the length of the second part of the first electrode conductor is smaller than the length of the second part of the third electrode conductor.

4. The multilayer coil component according to claim 2, wherein the width of the first part of the first electrode conductor is smaller than the width of the first part of the third electrode conductor, wherein the length of the first part of the first electrode conductor is smaller than the length of the first part of the third electrode conductor, wherein the width of the second part of the first electrode conductor is smaller than the width of the second part of the third electrode conductor, and wherein the length of the second part of the first electrode conductor is smaller than the length of the second part of the third electrode conductor.

5. The multilayer coil component according to claim 1, wherein the width of the first part of the first electrode conductor is larger than the width of the first part of the second electrode conductor, wherein the length of the first part of the first electrode conductor is larger than the length of the first part of the second electrode conductor, wherein the width of the second part of the first electrode conductor is smaller than the width of the second part of the second electrode conductor, and wherein the length of the second part of the first electrode conductor is smaller than the length of the second part of the second electrode conductor.

6. The multilayer coil component according to claim 5, wherein the width of the first part of the first electrode conductor is larger than the width of the first part of the third electrode conductor, wherein the length of the first part of the first electrode conductor is larger than the length of the first part of the third electrode conductor, wherein the width of the second part of the first electrode conductor is smaller than the width of the second part of the third electrode conductor, and wherein the length of the second part of the first electrode conductor is smaller than the length of the second part of the third electrode conductor.

7. The multilayer coil component according to claim 1, wherein the plurality of electrode conductors included in the first external electrode include a fifth electrode conductor and a sixth electrode conductor adjacent to each other in the first direction, wherein the plurality of electrode conductors included in the second external electrode include a seventh electrode conductor positioned at the same layer as the fifth electrode conductor, and an eighth electrode conductor positioned at the same layer as the sixth electrode conductor, wherein the first electrode conductor is closest to the first side surface of the plurality of electrode conductors included in the first external electrode, and the fifth electrode conductor is closest to the second side surface of the plurality of electrode conductors included in the first external electrode, wherein the third electrode conductor is closest to the first side surface of the plurality of electrode conductors included in the second external electrode, and the seventh electrode conductor is closest to the second side surface of the plurality of electrode conductors included in the second external electrode, wherein the fifth electrode conductor and the seventh electrode conductor differ from each other in at least any one dimension of the four dimensions, wherein the sixth electrode conductor and the eighth electrode conductor differ from each other in at least any one dimension of the four dimensions, wherein the fifth electrode conductor and the sixth electrode conductor differ from each other in at least any one dimension of the four dimensions, and wherein the seventh electrode conductor and the eighth electrode conductor differ from each other in at least any one dimension of the four dimensions.

8. The multilayer coil component according to claim 7, wherein the length of the first part of the first electrode conductor is larger than the length of the first part of the second electrode conductor, wherein the length of the second part of the first electrode conductor is smaller than the length of the second part of the second electrode conductor, wherein the length of the first part of the fifth electrode conductor is smaller than the length of the first part of the sixth electrode conductor, and wherein the length of the second part of the fifth electrode conductor is larger than the length of the second part of the sixth electrode conductor.

9. The multilayer coil component according to claim 7, wherein the coil includes a plurality of coil conductors arranged in the first direction and connected to each other, wherein the plurality of coil conductors include a first coil conductor positioned at the same layer as the first electrode conductor and the third electrode conductor, and a second coil conductor positioned at the same layer as the fifth electrode conductor and the seventh electrode conductor, wherein each of the first coil conductor and the second coil conductor includes a third part constituting a portion of an annular trajectory in the coil, and a fourth part being continuous with the third part and protruding to an outward side of the annular trajectory when viewed in the first direction, wherein the fourth part of the first coil conductor is connected to the second part of the third electrode conductor, and the fourth part of the second coil conductor is connected to the second part of the fifth electrode conductor, wherein the length of the second part of the third electrode conductor is smaller than the length of the second part of the fourth electrode conductor, and wherein the length of the second part of the fifth electrode conductor is smaller than the length of the second part of the sixth electrode conductor.

10. The multilayer coil component according to claim 8, wherein the coil includes a plurality of coil conductors arranged in the first direction and connected to each other, wherein the plurality of coil conductors include a first coil conductor positioned at the same layer as the first electrode conductor and the third electrode conductor, and a second coil conductor positioned at the same layer as the fifth electrode conductor and the seventh electrode conductor, wherein each of the first coil conductor and the second coil conductor includes a third part constituting a portion of an annular trajectory in the coil, and a fourth part being continuous with the third part and protruding to an outward side of the annular trajectory when viewed in the first direction, wherein the fourth part of the first coil conductor is connected to the second part of the third electrode conductor, and the fourth part of the second coil conductor is connected to the second part of the fifth electrode conductor, wherein the length of the second part of the third electrode conductor is smaller than the length of the second part of the fourth electrode conductor, and wherein the length of the second part of the fifth electrode conductor is smaller than the length of the second part of the sixth electrode conductor.

11. The multilayer coil component according to claim 1, wherein the width of the first part of the first electrode conductor is larger than the width of the first part of the second electrode conductor, wherein the length of the first part of the first electrode conductor is smaller than the length of the first part of the second electrode conductor, wherein the width of the second part of the first electrode conductor is smaller than the width of the second part of the second electrode conductor, and wherein the length of the second part of the first electrode conductor is larger than the length of the second part of the second electrode conductor.

12. The multilayer coil component according to claim 11, wherein the width of the first part of the first electrode conductor is larger than the width of the first part of the third electrode conductor, wherein the length of the first part of the first electrode conductor is smaller than the length of the first part of the third electrode conductor, wherein the width of the second part of the first electrode conductor is smaller than the width of the second part of the third electrode conductor, and wherein the length of the second part of the first electrode conductor is larger than the length of the second part of the third electrode conductor.

13. The multilayer coil component according to claim 1, wherein the coil includes a plurality of coil conductors arranged in the first direction and connected to each other, wherein the plurality of coil conductors include a first coil conductor positioned at the same layer as the first electrode conductor and the third electrode conductor, wherein a shortest separation distance between the second part of the first electrode conductor and the first coil conductor is smaller than a shortest separation distance between the second part of the third electrode conductor and the first coil conductor, wherein the width of the second part of the first electrode conductor is smaller than the width of the second part of the third electrode conductor, and wherein the length of the second part of the first electrode conductor is smaller than the length of the second part of the third electrode conductor.

14. The multilayer coil component according to claim 13, wherein the plurality of coil conductors include a third coil conductor positioned at the same layer as the second electrode conductor and the fourth electrode conductor, wherein the shortest separation distance between the second part of the first electrode conductor and the first coil conductor is smaller than a shortest separation distance between the second part of the second electrode conductor and the third coil conductor, wherein the width of the second part of the first electrode conductor is smaller than the width of the second part of the second electrode conductor, and wherein the length of the second part of the first electrode conductor is smaller than the length of the second part of the second electrode conductor.

15. The multilayer coil component according to claim 1, wherein the first part of each of the plurality of electrode conductors includes a first end and a second end in the second direction, wherein the second part of each of the plurality of electrode conductors includes a first end and a second end in the third direction, wherein the first end of the first part and the first end of the second part are continuous with each other, and wherein a surface of each of the second end of the first part and the second end of the second part is curved when viewed in the first direction.

* * * * *